(12) United States Patent
Kaida

(10) Patent No.: US 12,542,974 B2
(45) Date of Patent: Feb. 3, 2026

(54) PHOTOGRAPHING SYSTEM HAVING EXPOSURE CONTROL WITH SENSING RESULT, PHOTOGRAPHING DEVICE, AND CONTROLLING METHOD

(71) Applicant: CANON KABUSHIKI KAISHA, Tokyo (JP)

(72) Inventor: Hironori Kaida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/492,115

(22) Filed: Oct. 23, 2023

(65) Prior Publication Data
US 2024/0147078 A1 May 2, 2024

(30) Foreign Application Priority Data
Oct. 27, 2022 (JP) .................... 2022-172595

(51) Int. Cl.
*H04N 23/73* (2023.01)
*H04N 23/611* (2023.01)
*H04N 23/67* (2023.01)
*H04N 23/68* (2023.01)

(52) U.S. Cl.
CPC .......... *H04N 23/73* (2023.01); *H04N 23/611* (2023.01); *H04N 23/671* (2023.01); *H04N 23/6812* (2023.01); *H04N 23/683* (2023.01)

(58) Field of Classification Search
CPC .... H04N 23/73; H04N 23/611; H04N 23/671; H04N 23/6812; H04N 23/683; H04N 23/66; H04N 23/684; H04N 23/6811
See application file for complete search history.

(56) References Cited

U.S. PATENT DOCUMENTS

| 8,036,525 B2 * | 10/2011 | Lee ........................ H04N 23/68 396/246 |
| 2016/0088219 A1 * | 3/2016 | Matsumoto ............ H04N 5/783 348/169 |

FOREIGN PATENT DOCUMENTS

JP 2016072673 A 5/2016
WO WO-2008010559 A1 * 1/2008 ............... G03B 5/00

* cited by examiner

*Primary Examiner* — Ahmed A Berhan
(74) *Attorney, Agent, or Firm* — Canon U.S.A., Inc. IP Division

(57) ABSTRACT

A photographing system includes an image capturing device and a sensor device worn on a subject. The image capturing device includes an image sensor, a subject motion detector, a receiver, and an exposure controller. The image sensor is configured to capture an image of the subject. The subject motion detector is configured to detect a motion of the subject using the captured image. The receiver is configured to receive a sensing result transmitted from an external device. The exposure controller is configured to control exposure of the image sensor. The sensor device includes a sensor and a transmitter. The sensor is configured to acquire information on the subject. The transmitter is configured to transmit the sensing result of the sensor to the image capturing device. The exposure controller receives the sensing result and controls the exposure using the sensing result and a detection result of the motion.

8 Claims, 23 Drawing Sheets

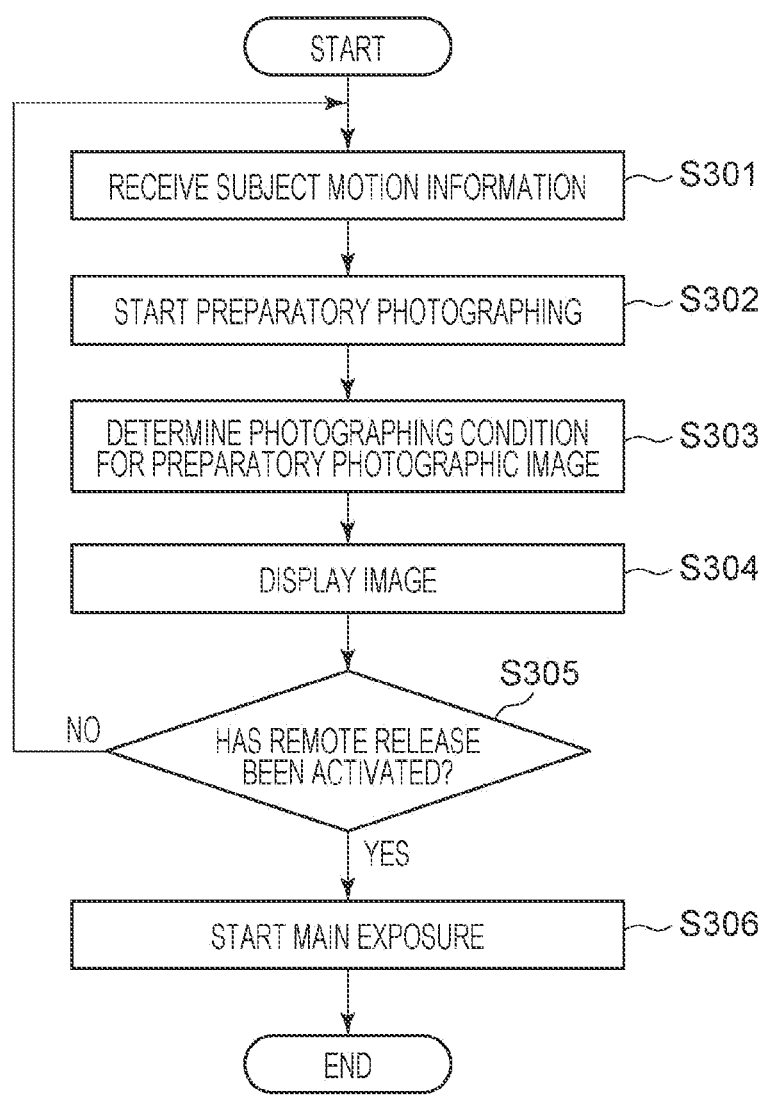

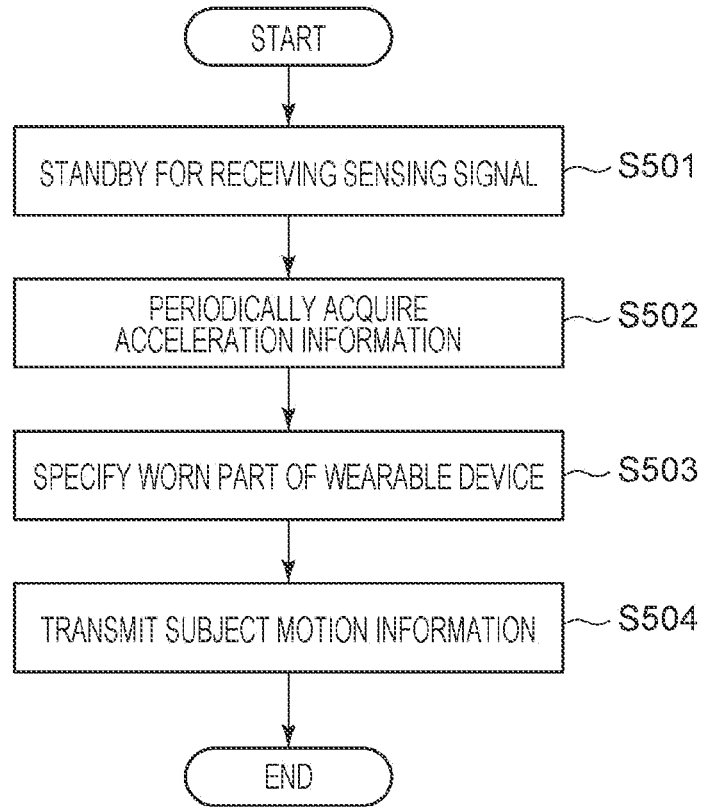
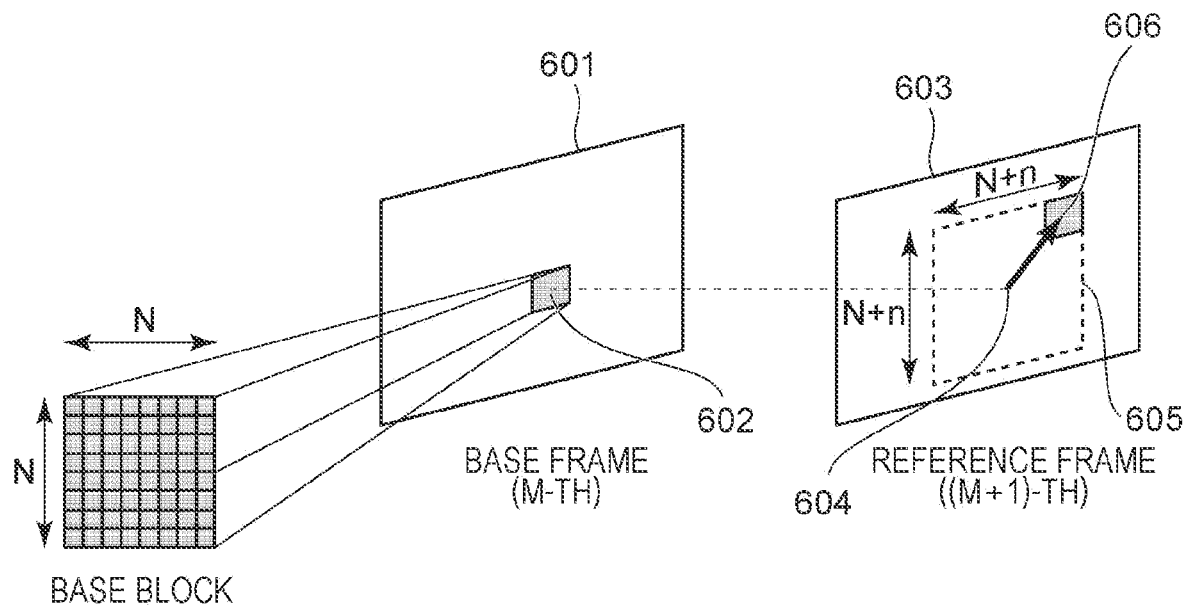

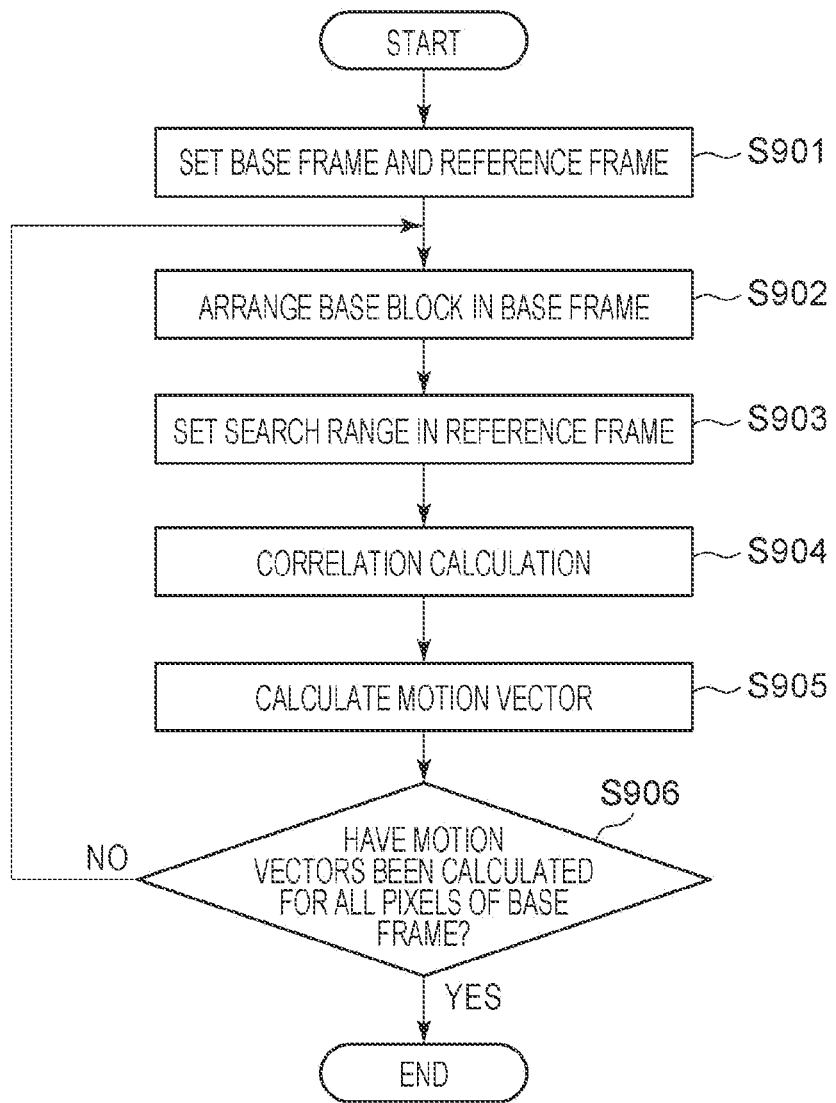

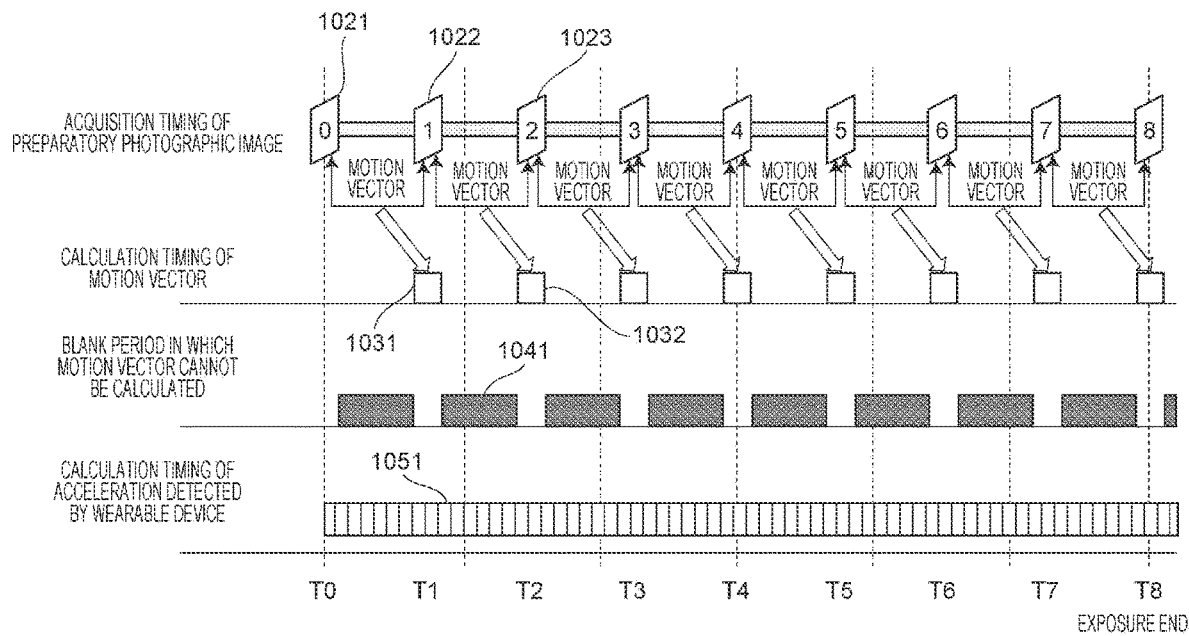

FIG. 20

SETTING FOR PRIORITY ORDER OF WEARABLE DEVICES

| SUBJECT ID | WEARABLE DEVICE ID | PRIORITY ORDER |
|---|---|---|
| SUBJECT A | 1701 | 4 |
| SUBJECT B | 1702 | 3 |
| SUBJECT B | 1703 | 2 |
| SUBJECT B | 1704 | 1 |
| SUBJECT C | 1705 | 5 |
| SUBJECT D | 1706 | 6 |
| SUBJECT E | 1707 | 7 |
| SUBJECT F | 1708 | 8 |

FIG. 21

PRIORITY LEVEL DETERMINATION ITEMS FOR MAIN WEARABLE DEVICE

| ITEM | SELECTION FOR PRIORITY LEVEL DETERMINATION OF MAIN WEARABLE DEVICE |
|---|---|
| ORDER OF ACCELERATION | ☑ |
| SETTING OF WORN PART | HEAD ☐ BODY ☐ HAND ☑ FOOT ☐ |
| ORDER OF AREA RATIO OF FACE IN ANGLE OF VIEW | ☐ |
| ORDER OF AREA RATIO OF WORN PART IN ANGLE OF VIEW | ☐ |
| ORDER OF DISTANCE BETWEEN CENTER OF ANGLE OF VIEW AND WEARABLE DEVICE | ☑ |
| ORDER OF DISTANCE BETWEEN CENTER OF FACE AND WEARABLE DEVICE | ☐ |
| ORDER OF FACE DETECTION RELIABILITY LEVEL | ☑ |

FIG. 22A

| SUBJECT ID | WEARABLE DEVICE ID | ORDER OF ACCELERATION (SCORE) | SETTING OF WORN PART | ORDER OF DISTANCE BETWEEN CENTER OF ANGLE OF VIEW AND WEARABLE DEVICE (SCORE) | ORDER OF FACE DETECTION RELIABILITY LEVEL (SCORE) | TOTAL SCORE |
|---|---|---|---|---|---|---|
| SUBJECT A | 1701 | 2(90) | LEFT HAND(100) | 4(70) | 100 | 260 |
| SUBJECT B | 1702 | - | HEAD(0) | - | - | - |
| SUBJECT B | 1703 | 1(100) | LEFT HAND(100) | 1(100) | 100 | 300 |
| SUBJECT B | 1704 | - | LEFT FOOT(0) | - | - | - |
| SUBJECT C | 1705 | 3(80) | LEFT HAND(100) | 5(60) | 100 | 240 |
| SUBJECT D | 1706 | 4(70) | LEFT HAND(100) | 2(90) | 90 | 250 |
| SUBJECT E | 1707 | 5(60) | LEFT HAND(100) | 3(80) | 90 | 230 |
| SUBJECT F | 1708 | 6(50) | LEFT HAND(100) | 6(50) | 80 | 180 |

PHOTOGRAPHING SYSTEM HAVING EXPOSURE CONTROL WITH SENSING RESULT, PHOTOGRAPHING DEVICE, AND CONTROLLING METHOD

BACKGROUND

Technical Field

The present disclosure relates to a technique of controlling photographing by a camera including an image sensor, and more particularly to a photographing system using a wearable device or the like, a photographing device, and a controlling method.

Description of the Related Art

In related art, there is known a monitoring camera or the like that performs automatic photographing based on a sensing result of an acceleration sensor or a human detection sensor.

For example, Japanese Patent Laid-Open No. 2016-072673 discloses that automatic photographing of a camera located at a distance is controlled in accordance with a situation of a portable device (wearable device).

However, in the related art technique disclosed in Japanese Patent Laid-Open No. 2016-072673, timing control of the automatic photographing is mainly performed based on the sensing result, and no consideration is given to automatic photographing setting of the camera including a motion state of a subject.

SUMMARY

A photographing system according to the present disclosure includes an image capturing device, and a sensor device worn on a subject. The image capturing device includes an image sensor, a subject motion detector, a receiver, and an exposure controller. The image sensor is configured to capture an image of the subject. The subject motion detector is configured to detect a motion of the subject using the captured image. The receiver is configured to receive a sensing result transmitted from an external device. The exposure controller is configured to control exposure of the image sensor. The sensor device includes a sensor and a transmitter. The sensor is configured to acquire information on the subject. The transmitter is configured to transmit the sensing result of the sensor to the image capturing device. The exposure controller receives the sensing result and controls the exposure of the image sensor using the sensing result and a detection result of the motion.

Further features of the present disclosure will become apparent from the following description of exemplary embodiments with reference to the attached drawings.

BRIEF DESCRIPTION OF THE DRAWINGS

FIG. 3 is a flowchart presenting an operation of a camera according to a first exemplary embodiment.

FIG. 5 is a flowchart presenting an operation of a wearable device.

FIG. 6 is a diagram illustrating block matching.

FIG. 9 is a flowchart presenting motion vector calculation processing.

FIGS. 10A to 10C are diagrams for correcting the motion vector of the subject.

FIG. 20 is a view illustrating a setting screen example for setting a priority order of wearable devices.

FIG. 21 is a view presenting priority level determination items for the wearable devices.

FIGS. 22A and 22B are views presenting a method of calculating the priority order of the wearable devices.

DESCRIPTION OF THE EMBODIMENTS

Hereinafter, desirable embodiments of the present disclosure will be described in detail with reference to the accompanying drawings. The present embodiment is a photographing system in which a wearable device such as a smartphone or a wrist-watch type terminal is linked for cooperation with a camera to automatically implement an exposure control operation of the camera.

Accordingly, even in a use case such as unmanned photographing or self-taking photography (selfography, selfie), exposure control is implemented so as to suppress a motion of a subject to a desired blur or less.

Figure 1:
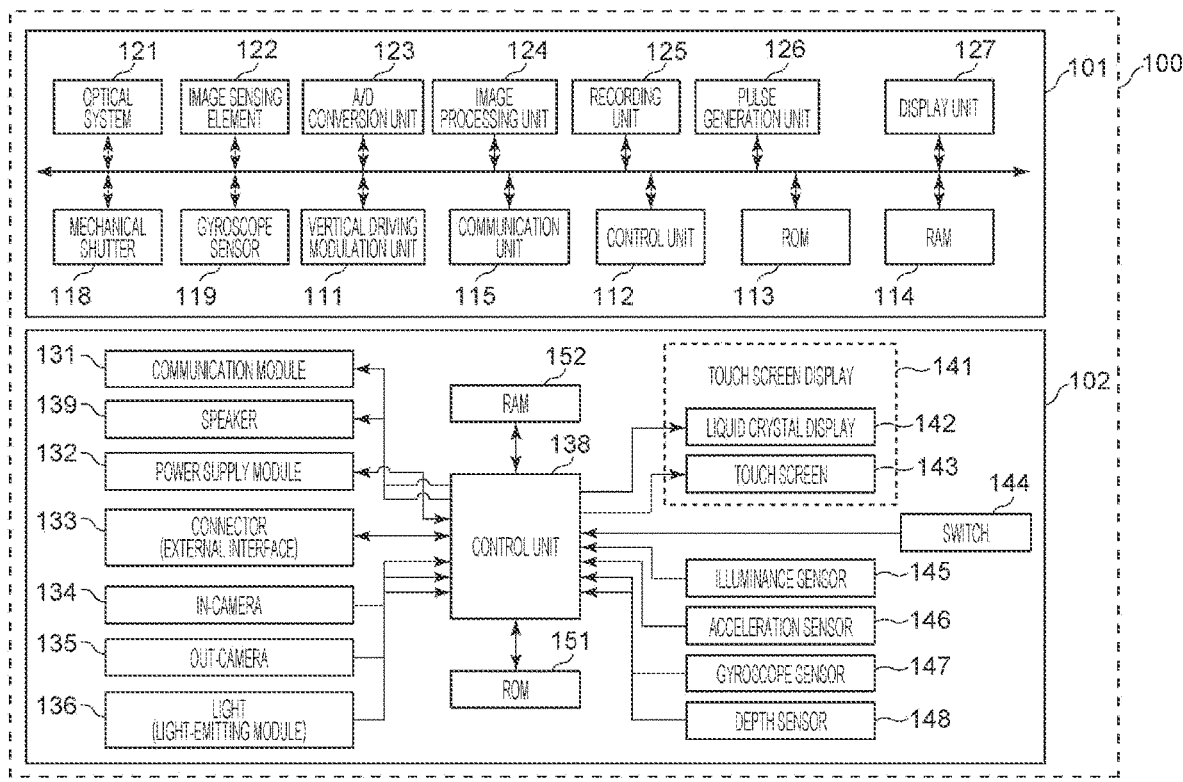
FIG. 1 is a diagram illustrating a configuration example of the present disclosure.
Figure 2A:
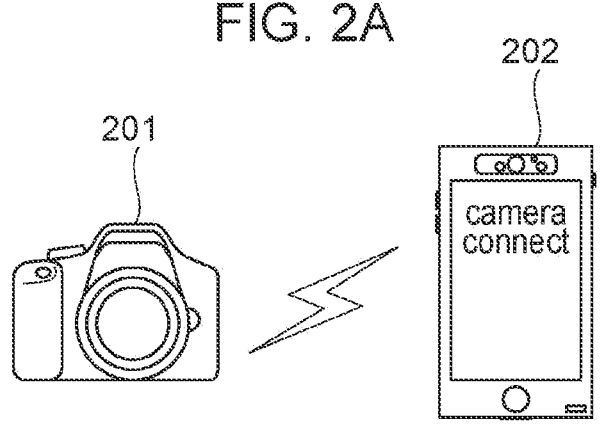
FIGS. 2A to 2C are views illustrating examples of appearances of a photographing system.
Figure 2B:
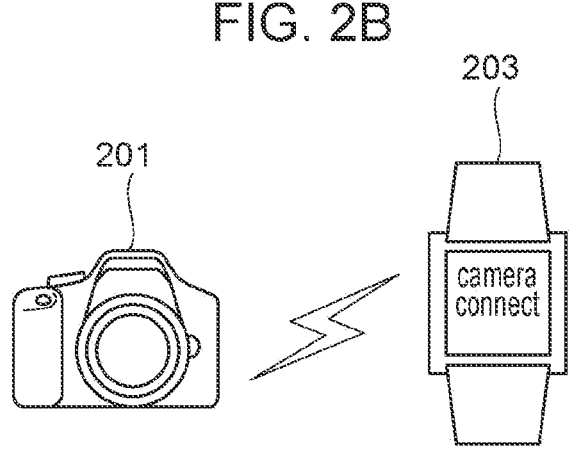
Figure 2C:
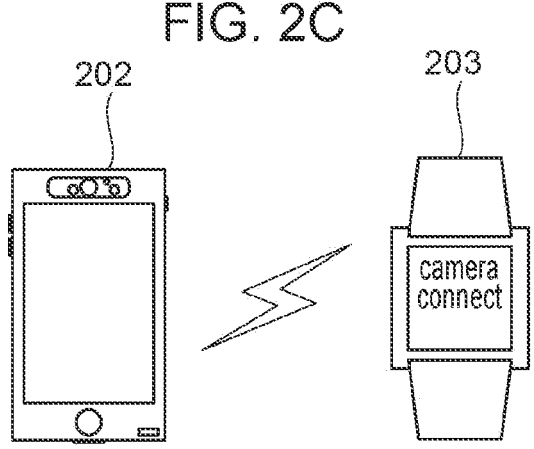

As an example of a photographing system 100 illustrated in FIG. 1 and described in the present embodiment, the photographing system 100 illustrated in FIG. 1 is implemented by two devices of a camera 101 and a wearable device 102. Examples of the wearable device 102 include a smartphone and a wrist-watch type terminal. FIGS. 2A to 2C are views illustrating appearances of embodiments of the present disclosure. FIG. 2A illustrates the photographing system 100 in which two devices of a single-lens reflex camera as the camera 101 and a smartphone as the wearable device 102 are connected to each other.

A control unit 112 is, for example, a central processing unit (CPU). The control unit 112 reads a control program for each block included in the camera 101 from a read-only memory (ROM) 113 (described later), loads the control program into a random-access memory (RAM) 114 (described later), and executes the control program. Accordingly, the control unit 112 controls the entire camera 101 and controls the operation of each block included in the camera 101.

The ROM 113 is an electrically erasable/recordable non-volatile memory, and stores parameters and the like necessary for the operation of each block in addition to an operation program of each block included in the camera 101.

The RAM 114 is a rewritable volatile memory, and is used for, for example, loading a program to be executed by the control unit 112 or the like, and temporarily storing data generated by the operation of each block included in the camera 101.

A communication unit 115 performs communication in accordance with a predetermined wireless communication standard. Examples of the wireless communication standard include so-called wireless fidelity (Wi-Fi) of the Institute of Electrical and Electronics Engineers (IEEE) 802.11 standard, Bluetooth (registered trademark), and near-field communication (NFC), and the communication unit 115 may support at least one of them.

An optical system 121 includes, for example, a lens group including optical elements such as a zoom lens and a focus lens, and forms an incident subject image on an image sensing plane of an image sensing element 122 (described later).

The image sensing element 122 is constituted by, for example, a charge-coupled device (CCD) or a complementary metal-oxide semiconductor (CMOS) sensor. During exposure, each pixel of the image sensing element 122 photoelectrically converts an optical image formed on the image sensing plane of the image sensing element 122 by the optical system 121, and outputs an obtained analog image signal to an analog-to-digital (A/D) conversion unit 123 (described later).

The A/D conversion unit 123 converts the input analog image signal into digital image data, and the digital image data output from the A/D conversion unit 123 is temporarily stored in the RAM 114.

An image processing unit 124 generates an image by applying various types of image processing such as white balance adjustment, color interpolation, and gamma processing on the image data stored in the RAM 114. The image processing unit 124 also executes predetermined calculation processing using the captured image signal, and based on the obtained calculation result, performs image capturing control such as exposure control using a pulse generation unit 126 and a vertical driving modulation unit 111 (described later), and ranging control. The image processing unit 124 can further perform processing such as subject recognition on the image data using an existing method. It is also possible to provide a motion vector calculation unit (not illustrated) and obtain a motion vector between images using a plurality of pieces of image data.

A recording unit 125 is a detachable memory card or the like, and records the image data processed by the image processing unit 124 as a recorded image via the RAM 114.

The pulse generation unit 126 supplies a scanning clock (horizontal driving pulse) and a predetermined control pulse to the image sensing element 122 when a transition is made from a non-photographing state to a photographing state. Among scanning clocks generated by the pulse generation unit 126, a vertical scanning clock is input to the vertical driving modulation unit 111 (described later).

The vertical driving modulation unit 111 modulates the vertical scanning clock among the scanning clock signals generated by the pulse generation unit 126 to have a predetermined clock frequency and inputs the modulated clock to the image sensing element 122. The vertical driving modulation unit 111 determines a scanning pattern of reset scanning to be performed per line of the image sensing element 122 including a plurality of pixels. The reset scanning per line of the image sensing element 122 implements a function as an electronic front curtain shutter.

A gyroscope sensor 119 is a motion detection sensor that detects an angular velocity, and determines the magnitude of shaking of the camera 101.

A mechanical shutter 118 is an openable and closable shutter mechanism that implements a light-shielding mechanism that physically blocks light incident on the image sensing element 122. In the present embodiment, the mechanical shutter 118 serves as a rear curtain (hereinafter referred to as a mechanical rear curtain) constituted by a plurality of light-shielding blades. The control unit 112 can control an exposure time (shutter speed) by adjusting a timing at which the mechanical rear curtain starts traveling. In contrast, the function of the electronic front curtain is implemented by sequentially performing the reset scanning on the pixels of the image sensing element 122 per line at a predetermined timing.

A display unit 127 is a display device such as a liquid crystal display (LCD), and performs displaying of images stored in the RAM 114 and images recorded in the recording unit 125, displaying of an operation user interface for receiving an instruction from a user, and the like. The display unit 127 displays (live view display) an image captured by the image sensing element 122 for composition adjustment or the like during preparatory photographing.

The configuration of the camera 101 has been described above.

Next, the wearable device 102 will be described. The wearable device 102 includes a touch screen display 141, and characters, images, icons, and the like are displayed on a liquid crystal display 142. A touch screen 143 can detect a gesture operation.

An in-camera 134 includes a lens and an image sensing element such as a CCD or a CMOS sensor that converts an optical image into an electrical signal. The in-camera 134 is a small camera module having autofocus (AF), an aperture stop, a shutter speed adjustment function, and the like. The in-camera 134 captures an image of an object facing the touch screen display 141.

An illuminance sensor 145 detects illuminance in a photographing environment.

A control unit 138 is, for example, a CPU. The control unit 138 reads a control program for each block included in the wearable device 102 from a ROM 151 (described later), loads the control program into a RAM 152 (described later), and executes the control program. Accordingly, the control unit 138 controls the operation of each block included in the wearable device 102. The control unit 138 provides a camera function by controlling the touch screen 143, a switch 144, the in-camera 134, the illuminance sensor 145, an out-camera 135, a light 136, and the like.

The ROM 151 is an electrically erasable/recordable non-volatile memory, and stores parameters and the like necessary for the operation of each block in addition to an operation program of each block included in the wearable device 102.

The RAM 152 is a rewritable volatile memory, and is used for, for example, loading a program to be executed by the control unit 138 or the like, and temporarily storing data generated by the operation of each block included in the wearable device 102.

When setting of sound output is on, a speaker 139 outputs a shutter sound at a time of image capturing, a warning sound, and the like.

A connector 133 is used for connection between the wearable device 102 and an external device. For example, an AC adapter for charging a battery included in a power supply module 132 (described later) is connected to the connector 133. The connector 133 is also used to input/output image data and audio data to/from a non-volatile memory connected from the outside. The connector 133 may be a specially designed terminal such as a Dock connector or may be a general-purpose terminal such as a Universal Serial Bus (USB). By connecting a communication cable for communication with the outside to the connector 133 and connecting to, for example, the camera 101 or the like via the communication cable, it is also possible to transmit or receive information of a sensor group (described later).

The out-camera 135 is a small camera module similar to the in-camera 134. The out-camera 135 captures an image of a subject on the opposite side of the in-camera 134. The light 136 is a light-emitting module and functions as a flash when the out-camera 135 performs image capturing.

A communication module 131 performs communication in accordance with a predetermined wireless communication standard. Examples of the wireless communication standard include so-called Wi-Fi of the IEEE 802.11 standard, Bluetooth (registered trademark), and NFC, and the communication module 131 may support at least one of them. Specific examples of the communication include input/output of image data obtained by image capturing, download of a function addition program module to the wearable device 102, and transmission of information of a sensor group (the illuminance sensor 145, an acceleration sensor 146, a gyroscope sensor 147, and a depth sensor 148) (described later) to the camera 101.

The power supply module 132 includes a rechargeable battery and supplies power to the entire wearable device 102. As the battery provided in the power supply module 132, for example, a lithium-ion battery or a nickel-hydrogen battery is used.

The acceleration sensor 146 detects the direction and magnitude of acceleration acting on the wearable device 102. The acceleration sensor 146 can perform detection along three axes of XYZ directions.

The gyroscope sensor 147 detects an angle and an angular velocity of the wearable device 102.

The depth sensor 148 measures a distance from the camera to a subject to be photographed. Examples of a method of measuring the distance include a method of measuring a time until infrared rays, light, ultrasonic waves, or the like are reflected by an object and bounced back, and a method of acquiring depth (distance) information on a subject from a parallax image.

FIGS. 2A to 2C illustrate examples of appearances of the photographing system 100. FIGS. 2A to 2C each illustrate a combination of the camera 101 and the wearable device 102 that cooperate with each other as the photographing system 100. The camera 101 and the wearable device 102 are wirelessly connected to each other by, for example, Bluetooth and communicate with each other. Reference sign 201 denotes a mirrorless single-lens camera or a single-lens reflex camera as an example of the camera 101. Reference sign 202 denotes a smartphone as an example of the wearable device 102, and this smartphone is often equipped with a camera function. Thus, like the in-camera 134 and the out-camera 135 provided in the smartphone 202 in FIG. 2C, by using the camera function, it is possible to use the smartphone 202 as the camera 101 instead of the wearable device 102. The wearable device 102 in the form of a wrist-watch type terminal 203 or the like other than the smartphone can be used. Other examples of the camera 101 include various types as long as they have an image capturing function and a communication function.

The appearances and the system configurations of the photographing system 100 have been described above.

First Embodiment

Processing of the photographing system 100 according to a first embodiment of the present disclosure will be described below with reference to the flowcharts in FIG. 5 and FIG. 3. In the first embodiment of the present disclosure, a subject to be photographed wears the wearable device 102, and the camera 101 is configured as a remote camera disposed outside. Subject motion information is sensed through the wearable device 102, and photographing conditions of the camera 101 are determined using the subject motion information acquired by the wearable device 102 as auxiliary information. In the following processing, the control unit 112 of the camera 101 as the photographing system 100 controls each unit of the device in accordance with a program stored in the ROM 113. The wearable device 102 is implemented by the control unit 138 controlling each unit of the device in accordance with a program recorded in the ROM 151.

First, processing of the operation of the wearable device 102 will be described with reference to FIG. 5.

In step S501, first, the power of the wearable device 102 is turned on. When the power is turned on, sensors (the acceleration sensor 146, the gyroscope sensor 147, the depth sensor 148, and the like) for detecting subject motion information on the wearable device 102 start driving, and acquisition of a sensing signal is started. The wearable device 102 performs a standby operation for receiving a sensing signal from each sensor.

In step S502, the control unit 138 acquires the sensing signal acquired by each sensor in step S501 at regular time intervals. For example, for acceleration information on the wearable device 102, the control unit 138 periodically acquires an output from the acceleration sensor 146 at predetermined times. In this way, it is possible to obtain the acceleration information on a part of the subject wearing the wearable device 102. Instead of the acceleration sensor 146, it is also possible to indirectly acquire the acceleration information on the part of the subject wearing the wearable device 102 by using another sensor capable of detecting a motion state of the subject. As an example, by acquiring a change in distance from the camera 101 to the wearable device 102 by the depth sensor 148, it is possible to calculate a motion speed of the subject or acceleration information on the subject per unit time. That is, the wearable device 102 serves as a sensor that acquires various pieces of information on the subject.

In step S503, the wearable device 102 specifies which part of the subject to be photographed the wearable device 102 is worn on. Examples of a method of specifying the wearable device 102 include a method of setting which part of the subject the wearable device 102 is worn on in advance. In addition, a technique is known in which acceleration, magnitude of speed, and the like of a specific part within a predetermined time are recorded in advance and a moving subject part is specified based on an actual motion (Japanese Patent No. 6325581). For example, in step S502, the acceleration information is acquired from the acceleration sensor 146 of the wearable device 102. Thus, the wearable device 102 can specify the worn part by comparing a change in acceleration recorded per predetermined time for each worn part in advance with the acquired acceleration information. Alternatively, the worn part of the wearable device 102 can be specified from, for example, a captured image by the image processing unit 124 in the camera 101, and the wearable device 102 need not be configured to specify the worn part.

In step S504, the wearable device 102 transmits the acceleration information acquired in step S502 and worn part information on the wearable device 102 acquired in step S503 to the camera 101 as "subject motion information".

The processing of the wearable device 102 has been described above. Next, the operation of the camera 101 will be described in detail with reference to the flowchart in FIG. 3.

In step S301, the user turns on the power of the camera 101. Then, the camera 101 receives the subject motion information transmitted from the wearable device 102 via the communication unit 115 or the like.

In step S302, the user starts preparatory photographing such as composition adjustment with the camera 101. During the preparatory photographing period, the camera 101 successively captures images and displays them on the display unit 127 (live view display). The user performs the composition adjustment or the like while viewing the displayed images during the preparation photographing (preparatory photographic images). Processing in steps S304, S305, and S303 (described later) is performed during the preparatory photographing period, and is described as being performed before photographing for recording (main photographing).

In step S303, the control unit 112 determines photographing conditions (photographing parameters) for a preparatory photographic image to be captured in order to detect a motion vector of a subject in a composition. By using a subject motion amount in the composition when the preparatory photographing is performed under initial photographing conditions and the subject motion information transmitted from the wearable device 102, a shutter speed is set at which a subject blur of the part the wearable device 102 is worn on (subject attention part) is reduced. The details will be described later.

In step S304, the control unit 112 displays the subject in the composition and the photographing conditions (shutter speed, ISO sensitivity, F number, and the like) on the display unit 127.

In step S305, the control unit 112 determines whether a remote release has been activated. The "remote release" indicates a photographing (main photographing) instruction by a cable release or a radio-controlled operation device. For example, in the case of the radio-controlled operation device, a photographing instruction signal is wirelessly transmitted based on a user's operation. The transmitted signal is acquired by, for example, the communication unit 115, and the control unit 112 determines the acquired signal to control each unit. Alternatively, the camera 101 determines whether a photographer (user) has directly pressed a shutter button. At this time, the user presses the shutter button in accordance with a shutter timing while viewing the subject displayed on the display unit 127. When the remote release has been activated or the shutter button has been pressed, the processing proceeds to main exposure processing in step S306. In contrast, when the timing is not the shutter timing, the processing returns to step S301, so that the photographing setting can be performed again.

In step S306, the camera 101 performs exposure processing with the photographing setting performed in the processing of the above-described steps, and the image with the photographing completed is recorded in the ROM 113.

In this way, during the preparatory photographing, the user repeats the setting of the exposure time for the main photographing until a desired motion blur is obtained, and instructs the remote release or presses down the shutter button at a photographing opportunity.

Next, the processing in step S303, which is a feature of the present disclosure, will be described with reference to the flowchart in FIG. 7.

In step S701, the camera 101 sets initial photographing conditions and successively captures images. Here, the initial photographing conditions mainly indicate a frame rate and a shutter speed. The camera 101 sets the highest frame rate and the highest shutter speed within a range that does not influence processing of calculating an evaluation value used for control of an automatic function performed by a general camera, such as auto exposure (AE) control or autofocus (AF) control. The camera 101 also controls the optical system 121 in accordance with the shutter speed to control the aperture of the lens and the ISO sensitivity setting of the camera 101 (exposure control) so that photographing can be performed under an appropriate exposure condition even when the shutter speed is set to a high speed. Under the initial photographing conditions, the camera 101 captures images successive in time series. Regarding the captured images, it is desirable that the images are to be captured under conditions in which there is almost no accumulated blur of a moving subject and the movement amount of the subject between captured successive images is as small as possible. Under such photographing conditions, the ISO value tends to increase, and image data with a large amount of noise is often acquired. However, since the movement amount of the subject to be photographed can be reduced, the motion of even a fast subject can be captured.

In step S702, the motion vector calculation unit (not illustrated) of the image processing unit 124 calculates a motion vector of a subject from the preparatory photographic images that are captured in step S701 and successive in time series. The processing of calculating the motion vector of the subject will be described in detail with reference to FIGS. 6, 8A, 8B, and 9.

Figure 8A:
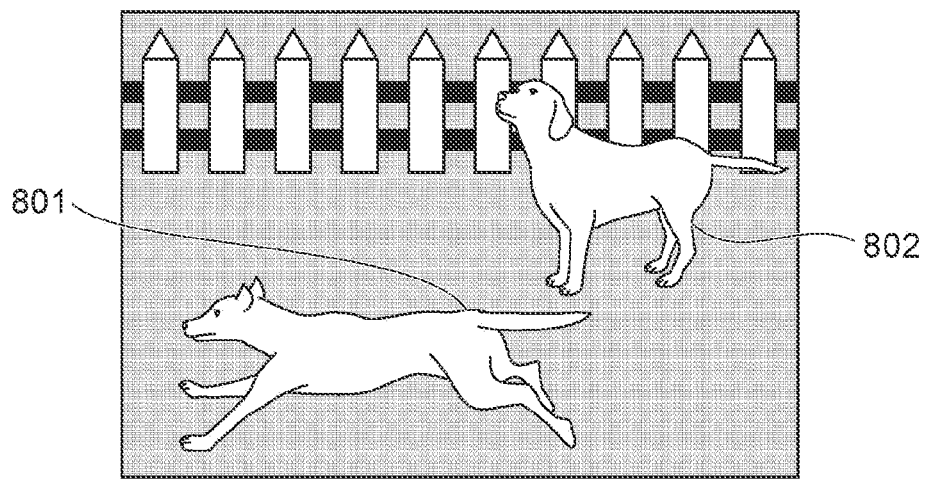
FIGS. 8A and 8B are diagrams illustrating a motion of a subject.

FIG. 8A illustrates an example in which a scene of a dog 801 running to the left and a dog 802 standing still is photographed. A motion vector represents a movement amount of a subject in the horizontal direction and a movement amount of the subject in the vertical direction between images of preparatory photographic images. An example of the motion vector is illustrated in FIG. 8B.

Figure 8B:
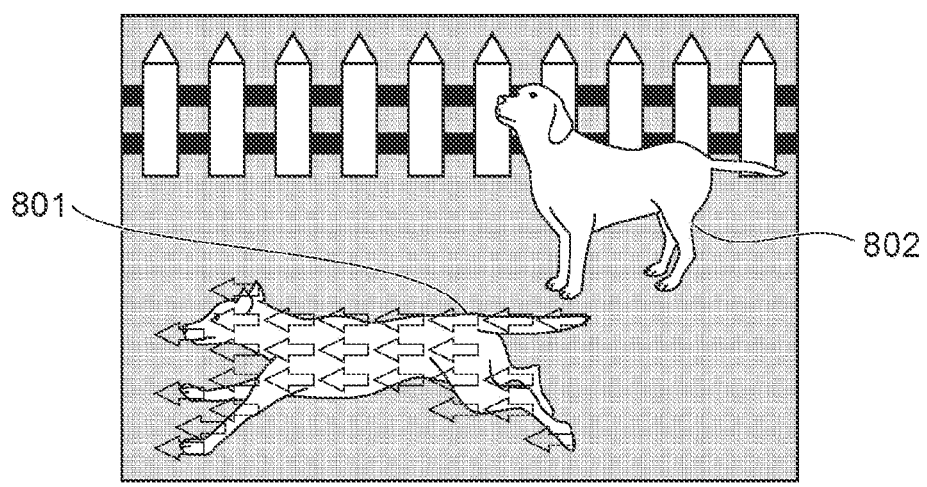

FIG. 8B is a diagram illustrating an example of a motion vector of a preparatory photographic image in FIG. 8A. In the example in FIG. 8B, the image processing unit 124 detects the running dog 801 as a motion vector in the left direction. In contrast, the image processing unit 124 detects the other stationary dog 802 and the fence in the background as motion vectors being 0, and hence the motion vectors are not indicated.

A method of calculating a motion vector will be described in detail with reference to FIGS. 9 and 6. FIG. 9 is a flowchart presenting motion vector calculation processing. In the present disclosure, a block matching method will be described as an example of a motion vector calculation method, but the motion vector calculation method is not limited to this example and may be, for example, a gradient method.

In step S901 in FIG. 9, the motion vector calculation unit of the image processing unit 124 receives two temporally adjacent preparatory photographic images, sets the preparatory photographic image of an M-th frame to a base frame, and sets the preparatory photographic image of an (M+1)-th frame to a reference frame.

In step S902, the motion vector calculation unit arranges a base block 602 of N×N pixels in a base frame 601 as illustrated in FIG. 6.

In step S903, as illustrated in FIG. 6, the motion vector calculation unit sets (N+n)×(N+n) pixels around coordinates 604 the same as the center coordinates of the base block 602 of the base frame 601 to a search range 605 in a reference frame 603.

In step S904, the motion vector calculation unit performs correlation calculation between the base block 602 of the base frame 601 and a reference block 606 of N×N pixels at different coordinates existing in the search range 605 of the reference frame 603 to calculate a correlation value. The correlation value is calculated based on the sum of absolute values of differences between frames for the pixels of the base block 602 and the reference block 606. That is, the coordinates at which the value of the sum of absolute values of differences between frames is the smallest are the coordinates at which the correlation value is the highest. The method of calculating the correlation value is not limited to the method of obtaining the sum of absolute values of differences between frames, and may be a method of calculating a correlation value based on, for example, the sum of squared differences between frames or a normal cross-correlation value. In the example in FIG. 6, it is assumed that the reference block 606 indicates the highest correlation.

In step S905, the motion vector calculation unit calculates a motion vector based on the reference block coordinates indicating the highest correlation value obtained in step S904. In the case of the example illustrated in FIG. 6, within the search range 605 of the reference frame 603, a motion vector is obtained based on the same coordinates 604 corresponding to the center coordinates of the base block 602 of the base frame 601 and the center coordinates of the reference block 606. That is, the distance and direction from the same coordinates 604 to the center coordinates of the reference block 606 are obtained as a motion vector.

In step S906, the motion vector calculation unit determines whether motion vectors have been calculated for all pixels of the base frame 601. When determining in step S906 that the motion vectors of all the pixels have not been calculated, the motion vector calculation unit returns the processing to step S902. Then, in step S902, the motion vector calculation unit arranges a base block 602 of N×N pixels in the above-described base frame 601 around a pixel for which a motion vector has not been calculated, and the processing from step S903 to step S905 is performed in a manner similar to that described above. That is, the motion vector calculation unit repeats the processing from step S902 to step S905 while moving the base block 602 in FIG. 6 to calculate motion vectors of all the pixels of the base frame 601. The motion vector may be calculated in units of pixels or in units obtained by dividing the image into a predetermined number of divisions. The motion vector is calculated by performing the above-described processing between the preparatory photographic images captured at times close to each other.

Then, in step S703, the image processing unit 124 calculates a vector corresponding to the main part of the subject using the subject motion information acquired from the wearable device 102 and the motion vector of the subject obtained in step S702. The image processing unit 124 specifies the vector corresponding to the main part of the subject in which the user desires to reduce the subject blur by using the subject motion information acquired by the wearable device 102, and then further performs processing of correcting the motion vector of the subject at the corresponding main part. This correction processing will be described in detail with reference to FIGS. 10A, 10B, and 10C.

Figure 10A:
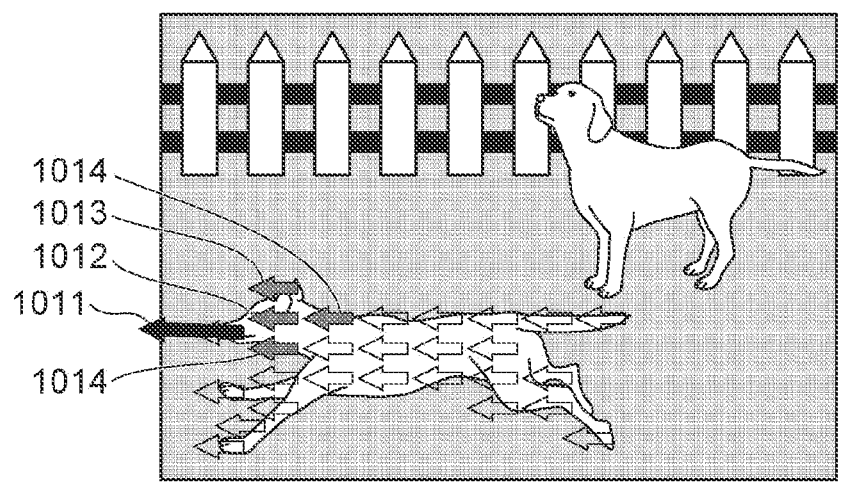

First, a method of specifying the vector corresponding to the main part of the subject will be described with reference to FIG. 10A. FIG. 10A is a diagram illustrating a motion vector group (1011, 1012, 1013, and 1014) of a candidate subject serving as a main part. Main part information is information corresponding to a worn part of the wearable device 102 included in the subject motion information transmitted in step S504. The correspondence between the main part of the subject and the motion vector of the subject is implemented by selecting the motion vector of the subject corresponding to the main part from the preparatory photographic image for obtaining the motion vector of the subject. As a method of detecting the main part from the preparatory photographic image, a method such as a general subject recognition technique may be used. For example, a case where the worn part of the wearable device 102 is a dog's head is considered. At this time, the image processing unit 124 detects a head region of the dog, which is the worn part of the wearable device 102, within a range in which the motion vector of the subject has been obtained in the preparatory photographic image for obtaining the motion vector of the subject. The image processing unit 124 selects a motion vector group (1011, 1012, 1013, and 1014) of a subject existing within a predetermined distance from the detected head region of the dog. The image processing unit 124 further detects a motion vector (1011) of the subject having the largest motion amount from among the motion vectors, and sets the motion vector to the motion vector of the subject at the main part.

Figure 10C:
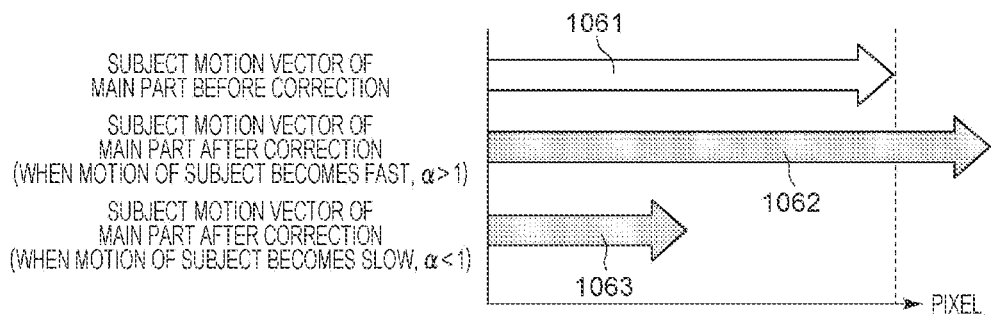

Then, the processing of correcting the motion vector of the subject at the corresponding main part will be described in detail with reference to FIGS. 10B and 10C. The correction of the motion vector of the subject at the main part is processing of correcting the motion vector of the subject by using the acceleration information on the worn part transmitted from the wearable device 102 having a high output update rate in contrast to the motion vector calculation processing having a low output update rate. Accordingly, the update rate of the motion vector of the subject can be increased in a pseudo manner, and the motion vector of the subject corresponding to the change in motion of the subject can be obtained.

FIG. 10B is a diagram illustrating acquisition timings of the motion vectors of the subject and the subject motion information.

In the present embodiment, the motion vector of the subject is calculated by obtaining the movement amount between the preparatory photographic images using two or more frames of the preparatory photographic images that are successive in time series. Thus, a motion vector 1031 of the subject cannot be obtained until the camera 101 acquires at least two frames of preparatory photographic images 1021 and 1022. Also, a next motion vector 1032 of the subject cannot be calculated until a preparatory photographic image 1023 is acquired. When the motion of the subject suddenly changes during a blank period 1041 until the motion vector 1032 of the subject is calculated from the motion vector 1031 of the subject, the image processing unit 124 cannot correctly detect the motion of the subject at that timing because the update rate of the motion vector of the subject is low. In contrast, the acceleration information as the subject motion information detected by the wearable device 102 does not depend on the preparatory photographic images and can directly detect the motion of the device. Thus, high-speed detection is generally possible (1051).

Since preparatory photographic images can be acquired by a general camera at about 120 fps even at high speed, the update rate of the motion vector of the subject is 120 fps or lower. In contrast, the output update rate of the acceleration sensor 146 provided in a smartphone which is a general wearable device 102 may be 100 times or more the output update rate of the motion vector of the subject.

Thus, when the image processing unit 124 corrects the motion vector of the subject using the acceleration information detected by the wearable device 102, it is possible to obtain the motion vector of the subject with higher accuracy even in a period in which the motion vector of the subject is not updated. Also, since the motion vector of the subject depends on the preparatory photographic image, there is a case where the motion vector of the subject cannot be obtained from an image of a low-contrast subject or an image in which an accumulated blur or an out-of-focus blur occurs, and there is a possibility that the update rate of the vector becomes further lower. Thus, it is effective to correct and update the motion vector of the subject using sensor information from the wearable device 102 having a high update rate.

Then, the correction processing for the motion vector of the main part will be described with reference to FIG. 10C. FIG. 10C illustrates a motion vector 1061 of the subject at the main part, a motion vector 1062 of the subject corrected when the motion of the subject becomes slow before the update of the motion vector of the subject, and a motion vector 1063 of the subject corrected when the motion of the subject becomes fast.

Since the motion vector of the main part with respect to the image has angles and magnitudes in plural directions, the magnitudes of the motion vector are converted into a magnitude of a vector using Equation (1). Since a motion vector used for an image generally has directionality on a two-dimensional coordinate system, the magnitudes of the motion vector can be converted into the magnitude of a vector as a scalar by applying Equation (1).

$$\text{Magnitude of vector} = \sqrt{(\text{magnitude in } x \text{ direction})^2 + (\text{magnitude in } y \text{ direction})^2} \quad (1)$$

As a method of correcting the motion vector of the subject, it is possible to perform gain processing corresponding to a change in acceleration of the main part until the time point when the motion vector of the subject is updated. Thus, when an acceleration change amount calculated using the acceleration information on the main part detected by the wearable device 102 is set to $\alpha$ (which is 1 if the acceleration does not change), the correction of the motion vector of the subject can be represented by Equation (2).

$$\text{Motion vector of subject after correction} = \alpha \times \text{motion vector of subject} \quad (2)$$

When the acceleration change amount $\alpha$ is smaller than 1, the motion vector of the subject at the main part before correction is corrected as the motion vector 1062, and when the acceleration change amount $\alpha$ is larger than 1, the motion vector of the subject at the main part before correction is corrected as the motion vector 1063 using Equation (1) described above. By correcting the motion vector of the subject at the main part in this way, the image processing unit 124 can obtain the blur amount of the main part so as not to generate a difference from the motion of the subject in real time as much as possible.

Then, in step S704, the image processing unit 124 estimates an amount of motion blur generated in the subject at the shutter speed set by the user (subject blur amount estimation) from the motion vector of the subject at the main part calculated in the processing of the above-described step. The subject motion blur amount is calculated by the following equation using the image-capturing frame rate of the preparatory photographic images for calculating the motion vector of the subject, the shutter speed set in the camera 101 by the user, and the motion vector of the subject.

$$\text{Subject motion blur amount} = \text{subject motion vector} \times (\text{frame rate (fps)/shutter speed (s)}) \quad (3)$$

Figure 11:
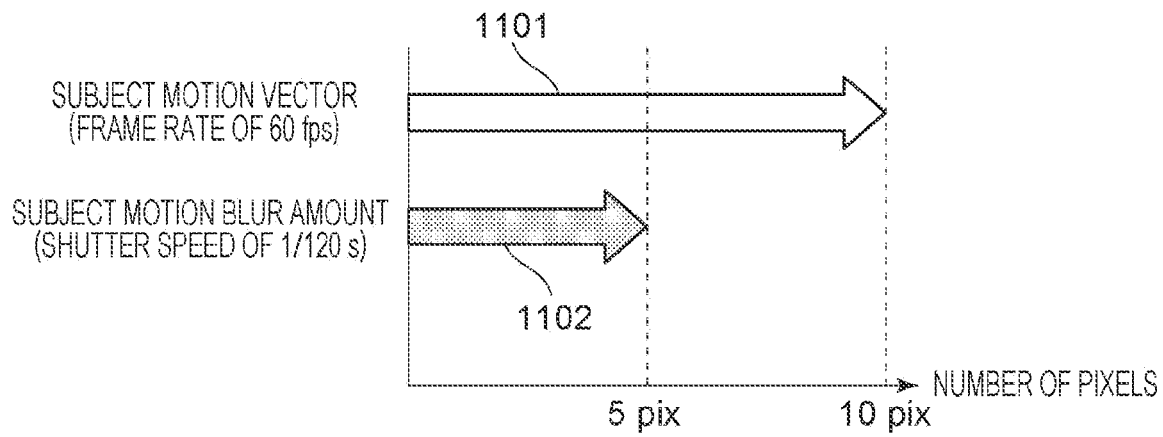
FIG. 11 is a diagram presenting a relationship between the motion vector of the subject and a subject motion blur amount.

The relationship between the motion vector of the subject and the subject motion blur amount will be described with reference to FIG. 11 in relation to Equation (3) described above. FIG. 11 is a diagram presenting the relationship between the motion vector of the subject and the subject motion blur amount. For example, since the motion vector of the subject is calculated using the previous and subsequent frames of the preparatory photographic images updated at the frame rate of 60 fps, the update frame rate of a motion vector 1101 of the subject is also 60 fps. In contrast, the subject motion blur amount corresponds to the shutter speed set by the user because the subject motion blur amount is a blur amount by which the subject has moved during exposure. For example, when the user sets the shutter speed to $\frac{1}{120}$ seconds (s), a subject motion blur amount 1102 is $\frac{1}{60}$ s between the previous and subsequent frames of the preparatory photographic images for obtaining the motion vector of the subject. That is, assuming that the magnitude of the motion vector 1101 of the subject is 10 pixels in terms of the number of pixels, 5 pixels having a half length thereof serves as the subject motion blur amount 1102.

Then, in step S705, the control unit 112 compares the subject motion blur amount calculated in step S704 with an allowable motion amount, changes the shutter speed for the preparatory photographic image to be captured next so that the subject motion blur amount is the allowable motion amount or less, and changes the photographing conditions for the preparatory photographic image. The allowable motion amount is a motion blur amount that is less noticeable as a motion blur when photographing is performed at a predetermined shutter speed. The magnitude of the allowable motion amount is determined in accordance with the size of the image sensing element such as a CCD or a CMOS sensor, the number of pixels, and the resolution of a display for displaying. For example, it is assumed that the allowable motion amount in a PC display having an image sensing element of advanced photo system type-C (APS-C), the number of pixels of 200000 pixels, and full high definition (HD) (1920×1080 pixels) is 5 pixels or less. In order for the camera 101 to capture the preparatory photographic image so that the motion blur amount is the allowable motion amount or less, the shutter speed is determined using the following Equation (4) and Inequality (5).

$$n = \text{subject motion blur amount/allowable motion amount} \quad (4)$$

At this time, if n obtained by Equation (4) is more than 1, it indicates that there is a high possibility that a subject blur will occur when photographing is performed at the currently set shutter speed, and if n is 1 or less, it indicates that there is a low possibility that a subject blur will occur. Thus, an appropriate shutter speed at which the occurrence of a subject blur is reduced is calculated using the following Inequality (5).

$$\text{Updated shutter speed (s)} \leq \text{set shutter speed} * (1/n) \quad (5)$$

Describing using specific numerical values, the motion blur amount 1102 in FIG. 11 is 5 pixels, and the allowable motion amount is also 5 pixels. Accordingly, n=1 is established by Equation (4), and it can be seen that the currently set shutter speed has almost no influence on the subject blur. Thus, the shutter speed as the photographing condition for the preparatory photographic image (which is the photographing condition for actual exposure if not changed as it is) may be set to an exposure time faster than $\frac{1}{120}$ s (in this case, no change from $\frac{1}{120}$ s) by Inequality (5). Also, when there is a sufficient light intensity for photographing, the shutter speed may be set to be faster than $\frac{1}{250}$ s in consideration of the ISO sensitivity and the aperture.

The example in which the shutter speed is updated as the photographing condition for the preparatory photographic image has been described above. In order to further improve the accuracy of detecting the motion vector of the subject, the frame rate at which the preparatory photographic image is captured may be increased to increase the update rate at which the motion vector of the subject is calculated. Thus, Inequality (6) is used to increase the update rate.

$$\text{Updated frame rate (fps)} \geq \text{set frame rate (fps)} * n \quad (6)$$

The frame rate and the shutter speed described above are important photographing conditions for performing motion detection. Also, in order to capture an image with appropriate brightness, the aperture value and the ISO sensitivity are also changed upon the changes in frame rate and shutter speed to control the exposure value so as not to change.

Figure 7:
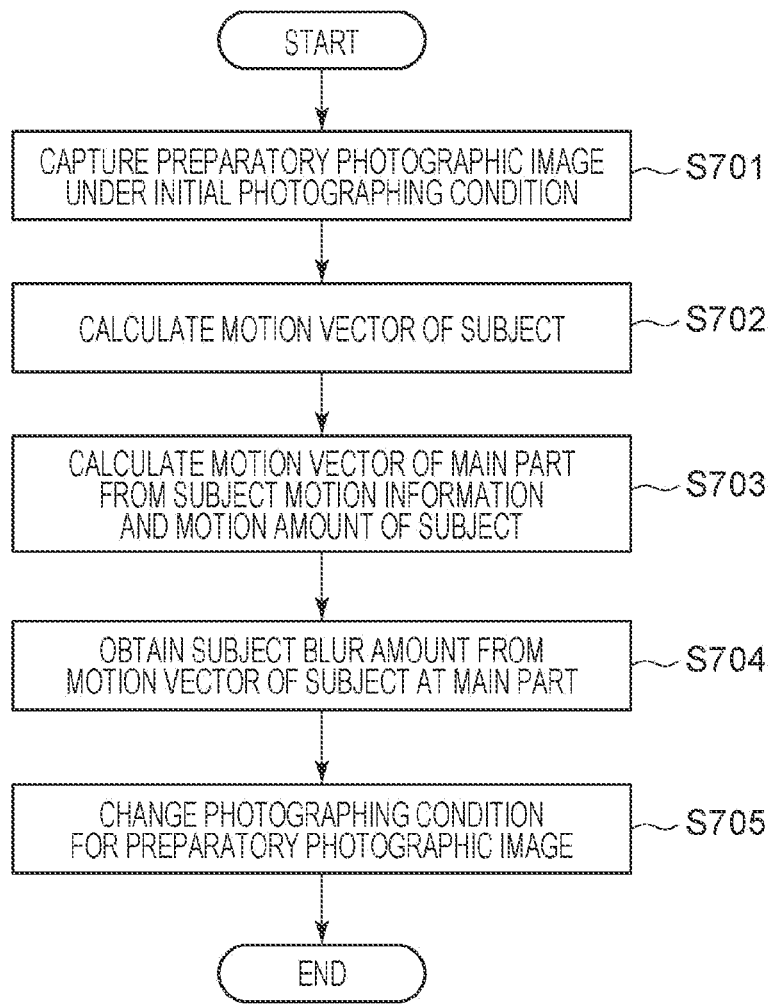
FIG. 7 is a flowchart presenting an operation of determining photographing conditions for a preparatory photographic image.

Regarding the detailed processing in step S303, processing of determining the photographing conditions for the preparatory photographic image (which are the photographing conditions for actual photographing if not changed as they are) using the processing in step S701 to step S705 in FIG. 7 has been described.

The processing of the photographing system 100 according to the first embodiment has been described above. Specifically, the subject motion information is sensed through the wearable device 102, the motion vector of the subject is updated using the subject motion information acquired by the wearable device 102 as the auxiliary information, and the photographing condition of the camera 101 is determined. According to the present disclosure, it is possible to increase the detection accuracy for the motion vector of the subject calculated by the camera 101 in cooperation with the wearable device 102 and to set the shutter speed at which the subject blur is reduced. Accordingly, the photographer can set the shutter speed without touching the camera so as to suppress the motion of the subject desired by the photographer to a desired blur or less, and can implement the exposure adjustment of photographing. According to the present disclosure, it is possible to expand the usage scene of automatic photographing.

In the first embodiment, the method of calculating the motion blur amount by converting the motion vector of the subject in accordance with the shutter speed set by the user when the image processing unit 124 calculates the motion blur amount has been described. Alternatively, in the conversion of the motion blur amount, it is not always necessary to match the set shutter speed. In this case, similar processing can be simply implemented by comparing the motion vector of the subject with a preset threshold and changing the shutter speed to a shutter speed faster than the current set value when the motion vector exceeds the threshold.

In the first embodiment, the method of specifying the main part of the subject and selecting the motion vector of the subject at the main part has been described. Alternatively, the motion vector of the subject having the fastest motion may be selected from the motion vectors of the subject obtained from the preparatory photographic images.

In the first embodiment, the method of specifying the main part of the subject and selecting the motion vector of the subject at the main part has been described. Alternatively, when an acceleration sensor similar to the acceleration sensor 146 provided in the wearable device 102 is provided in the camera 101, a motion vector of the subject different from the motion of the acceleration sensor provided in the camera 101 may be selected.

In the first embodiment, the method of specifying the main part of the subject and selecting the motion vector of the subject at the main part has been described. Alternatively, from among the calculated motion vectors of the subject, a motion vector of the subject may be selected from a range seen at the center of the angle of view when the camera 101 performs photographing or a range in the vicinity of an autofocus target.

In the first embodiment, the method of the image processing unit 124 specifying the main part of the subject and selecting the motion vector of the subject at the main part has been described. When the wearable device 102 is seen in the preparatory photographic image, the image processing unit 124 may detect the position of the wearable device 102 from the image and specify the main part based on the detection result.

Before selecting the motion vector of the subject at the main part, the image processing unit 124 may perform selection processing on the motion vector of the subject obtained from the preparatory photographic images. For example, in calculation such as template matching performed in the process of obtaining the motion vector of the subject, correlation value calculation is performed. At this time, a vector having a low correlation value is determined as a motion vector of the subject at a low reliability level. By performing the selection processing based on the calculation result of the reliability level (reliability level calculation) as described above, it is possible to extract only the motion vector of the subject with higher accuracy.

Second Embodiment

Hereinafter, a second embodiment that is a desirable embodiment of the present disclosure will be described in detail with reference to the accompanying drawings. In the second embodiment, the exposure control is performed based on the subject motion blur amount during the main exposure processing, so that an image in which the subject motion blur amount is reduced can be acquired. Processing on the wearable device 102 side of the photographing system 100 according to the second embodiment is similar to that according to the first embodiment, and thus description thereof will be omitted. An operation to be performed by the control unit 112 of the camera 101, which is a feature of the second embodiment, will be described with reference to the flowchart in FIG. 13. In the following processing, the camera 101 as the photographing system 100 is implemented by the control unit 112 controlling each unit of the device and executing each function in accordance with a program stored in the ROM 113. The wearable device 102 is implemented by the control unit 138 controlling each unit of the device and executing each function in accordance with a program recorded in the ROM 151. The same steps as those of the first embodiment are denoted by the same reference signs, and detailed description of the processing of the steps will be omitted.

Figure 4:
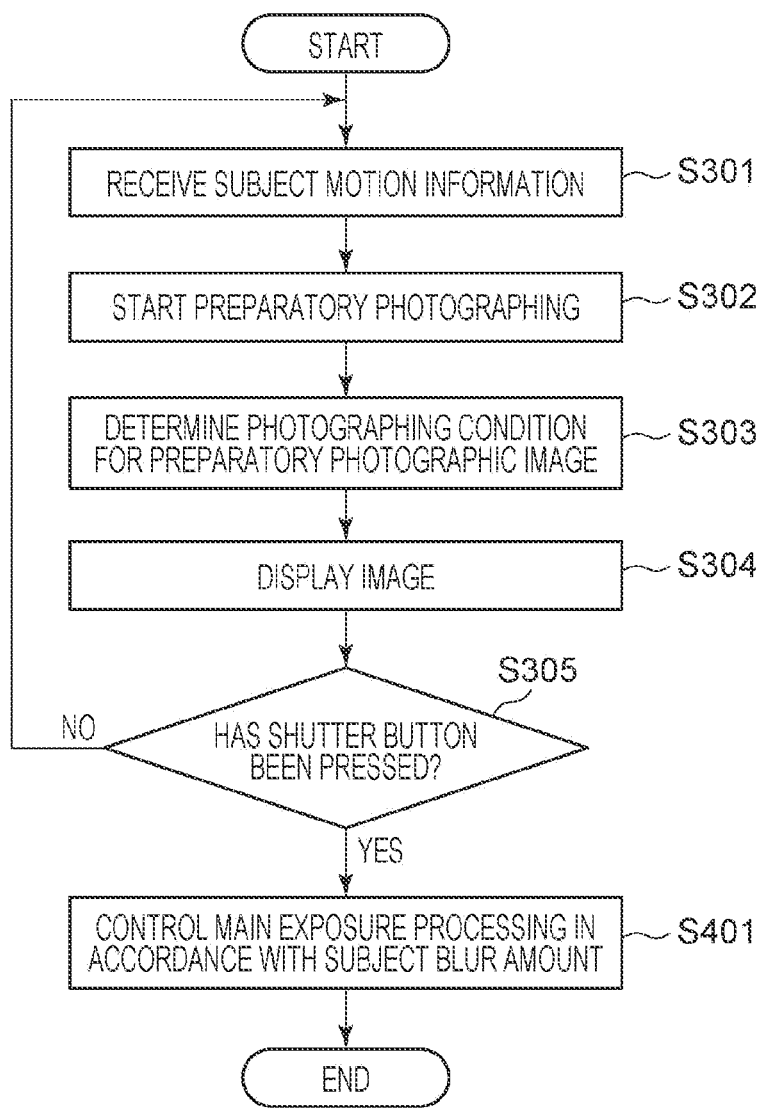
FIG. 4 is a flowchart presenting an operation of a camera according to a second exemplary embodiment.

First, a photographing operation of the camera 101 will be described with reference to FIG. 4. Since the processing from step S301 to step S305 in FIG. 4 is the same as the processing from step S301 to step S305 in FIG. 3 of the first embodiment, description thereof will be omitted. In the second embodiment, processing of main exposure in step S401 is different from that of the first embodiment. In step S401, the camera 101 performs exposure interruption processing based on a motion blur amount of target part of a subject during exposure, and performs photographing in which occurrence of a subject blur is suppressed.

Then, control of main exposure processing in step S401 performed by the control unit 112 of the camera 101 based on the motion blur amount with respect to the target part of the subject during exposure will be described in detail with reference to the flowchart in FIG. 13.

Figure 13:
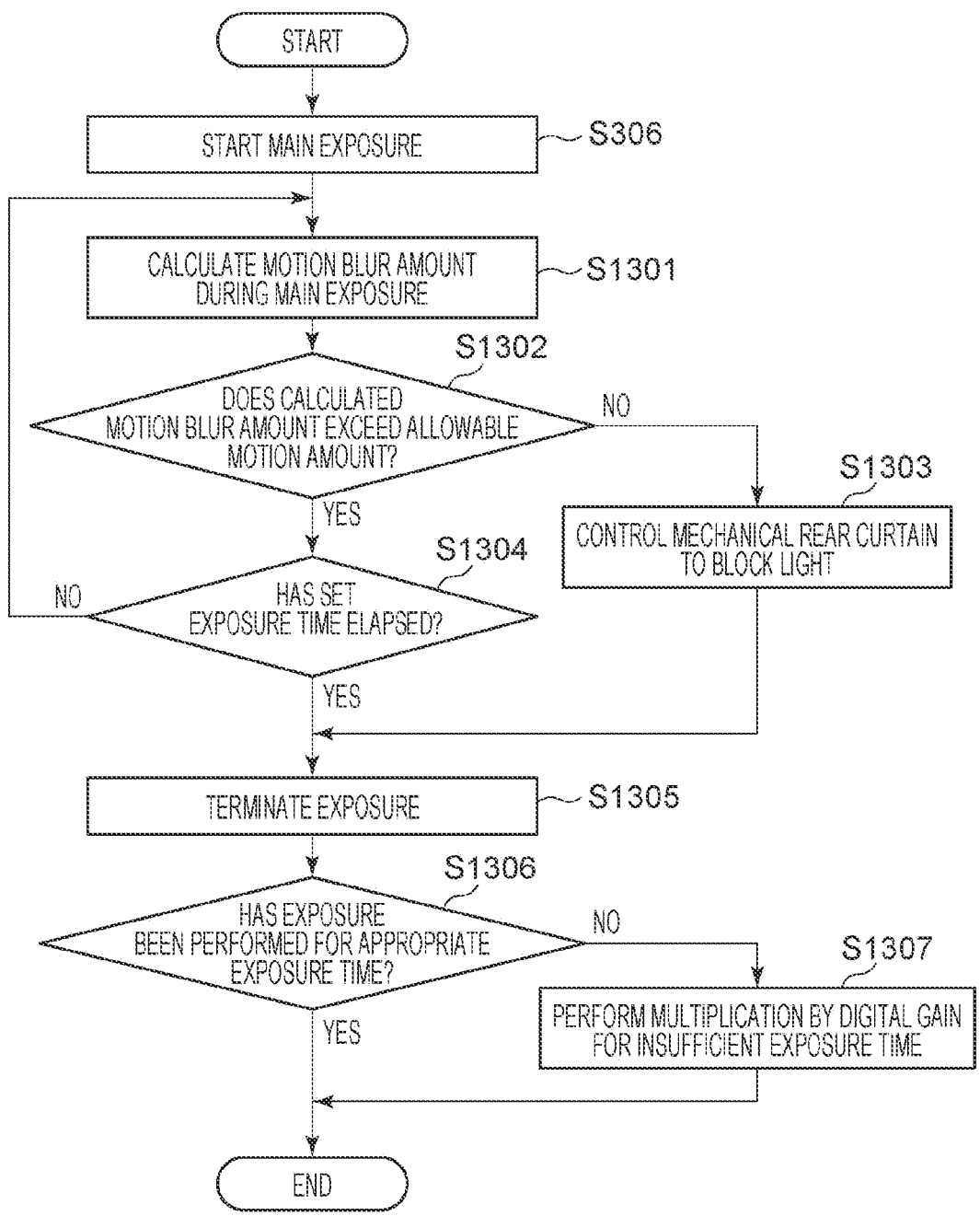
FIG. 13 is a flowchart presenting details of main exposure processing according to the second embodiment.

In step S306 in FIG. 13, the camera 101 starts the main exposure processing as in step S306 of the first embodiment. The configuration of the electronic front curtain shutter and the photographing operation when the main exposure processing is performed will be described in detail with reference to FIGS. 14, 15A, and 15B.

Figure 14:
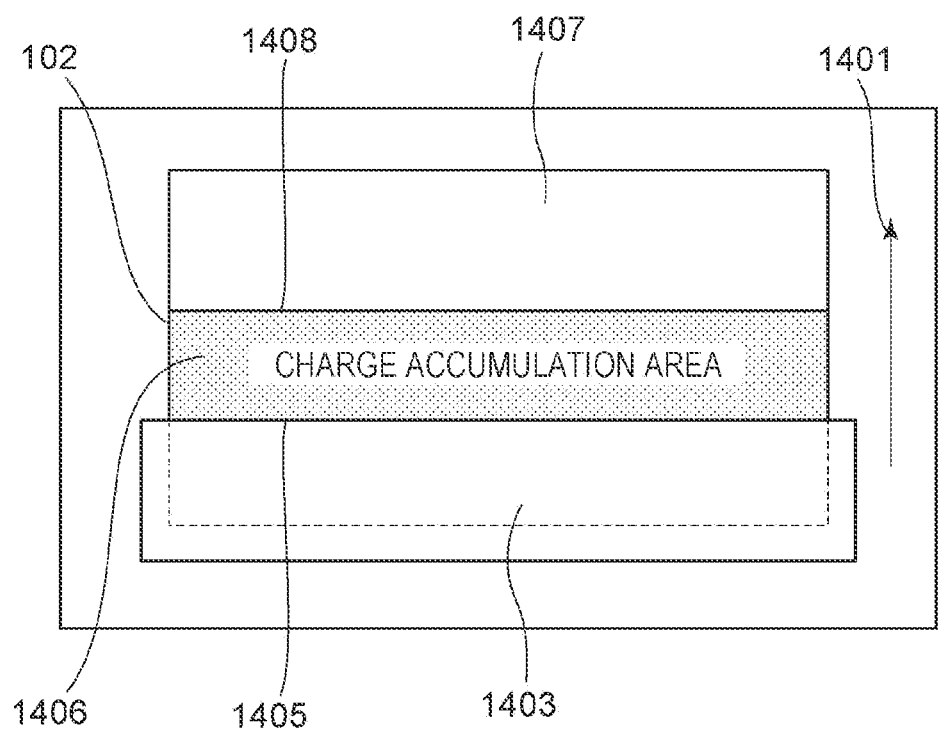
FIG. 14 is a diagram illustrating a configuration of an electronic front curtain shutter.
Figure 15A:
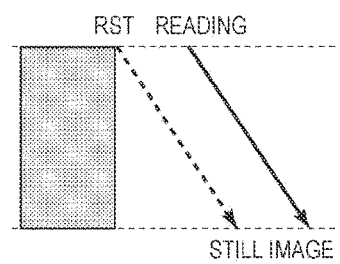
FIGS. 15A and 15B are diagrams illustrating an operation of the electronic front curtain shutter.
Figure 15B:
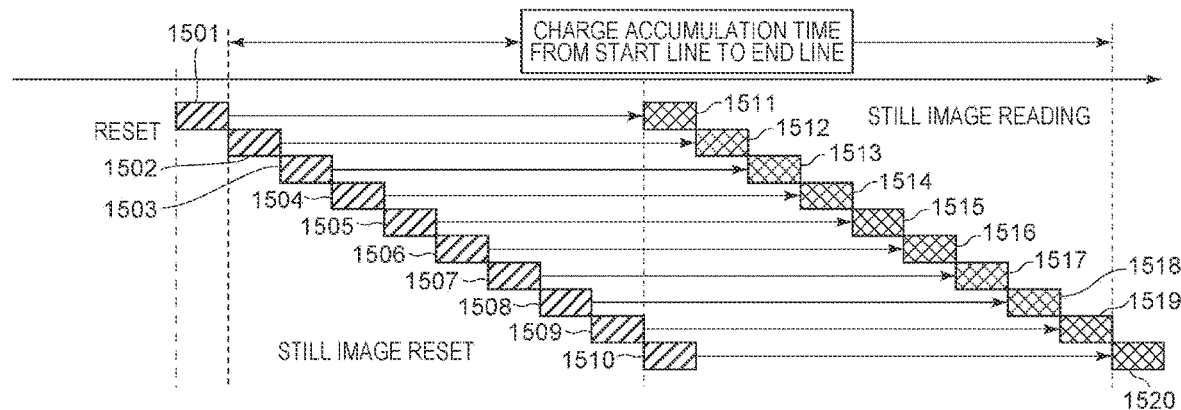

FIG. 14 is a front view illustrating a state in which the image sensing element 122 and a mechanical rear curtain 1403 are viewed from the lens side in the optical axis direction, and illustrates a state in which reset scanning performed by the image sensing element 122 after photographing is started and traveling of the mechanical rear curtain 1403 is in progress. An arrow 1401 indicates an operation direction of the reset scanning (a traveling direction of an electronic front curtain 1407) and a traveling direction of the mechanical rear curtain 1403. FIG. 14 illustrates a state in which the mechanical rear curtain 1403 constituted by the mechanical shutter 118 illustrated in FIG. 1 shields a partial region of the image sensing element 122 from light. Further, a reset line 1408 is a line (reset line) of the reset scanning performed by the image sensing element 122, and corresponds to an end portion of the electronic front curtain 1407 as an operation of resetting the accumulated charge amount of the pixel to 0. A region 1406 formed by a slit between the reset line 1408 and an end portion 1405 of the mechanical rear curtain 1403 is controlled to move in the direction of the arrow 1401 in accordance with the travel of the electronic front curtain 1407 and the mechanical rear curtain 1403. The time from when the reset line 1408 passes, that is, the time from when the pixels are sequentially reset per line in the direction of the arrow 1401 to when the pixels are brought into the light-shielded state by the mechanical rear curtain 1403 is a charge accumulation time by exposure of the pixels. As described above, since the reset line 1408 travels in the direction of the arrow 1401 and the charge accumulation per line is started, the starting timing of the charge accumulation is different for each line of the image sensing element 122. The timing of the charge accumulation will be described in detail with reference to FIGS. 15A and 15B. FIG. 15A is a schematic diagram of reset and start of reading of electric charges, and FIG. 15B is an explanatory diagram of timings of reset and reading of electric charges per line. Lines 1501 to 1510 in FIG. 15B represent timings at which reset processing of electric charges is performed per line, and an operation of resetting electric charges is performed after electric charges are read from the line 1501 at an end portion first. In contrast, a line 1510 at an end portion is the last line to be reset. In this way, the reset timing is controlled per line. Since the reset timing is different for each line, the control unit 112 performs control so that the charge accumulation time is the same for each line and the reading time for electric charges causes the same exposure time for each line in lines 1511 to 1520.

In step S1301 in FIG. 13, for the motion vector of the subject detected in step S303 in FIG. 4 and calculated by the camera 101 immediately before the main exposure, the control unit 112 corrects the motion vector of the subject calculated based on the output of the acceleration sensor 146 included in the subject motion information from the wearable device 102 during exposure. When the main exposure is started, the camera 101 no longer captures the preparatory photographic image unless a plurality of image sensing elements 122 exist, and thus cannot update the motion vector of the subject during the main exposure. Thus, for the motion vector of the subject at the target part calculated up to immediately before the main exposure, the motion vector of the subject at the main part corresponding to the processing in step S703 of the first embodiment is corrected using the acceleration information of the acceleration sensor 146. Then, processing of converting the corrected motion vector into a motion blur amount is performed. With the above-described processing, the motion blur amount can be estimated even during the main exposure of the camera 101.

In step S1302, the control unit 112 determines whether the motion blur amount estimated in step S1301 exceeds the allowable motion amount. When the allowable motion amount is exceeded, the processing proceeds to step S1303, and when the allowable motion amount is not exceeded, the processing proceeds to step S1304.

In step S1304, the control unit 112 determines whether the photographing conditions obtained in step S303 in FIG. 4 are satisfied. The photographing conditions mainly determine whether to influence the accumulated blur during exposure. This can be determined by whether to satisfy the exposure time corresponding to the shutter speed set before the main exposure. When the conditions are satisfied, the processing proceeds to step S1305 to terminate the exposure.

In step S1303, the control unit 112 determines that an accumulated blur will occur in the image if the image sensing element 122 continues to be exposed any more. The control unit 112 closes the mechanical shutter 118 earlier than the exposure time set in the photographing condition to block light incident on the image sensing element 122 so that external light does not enter the image sensing element 122, and proceeds to the processing in step S1305 to control the camera 101 so as to terminate the exposure. A method of performing exposure termination control in step S1303 will be described in detail with reference to FIG. 16.

Figure 16:
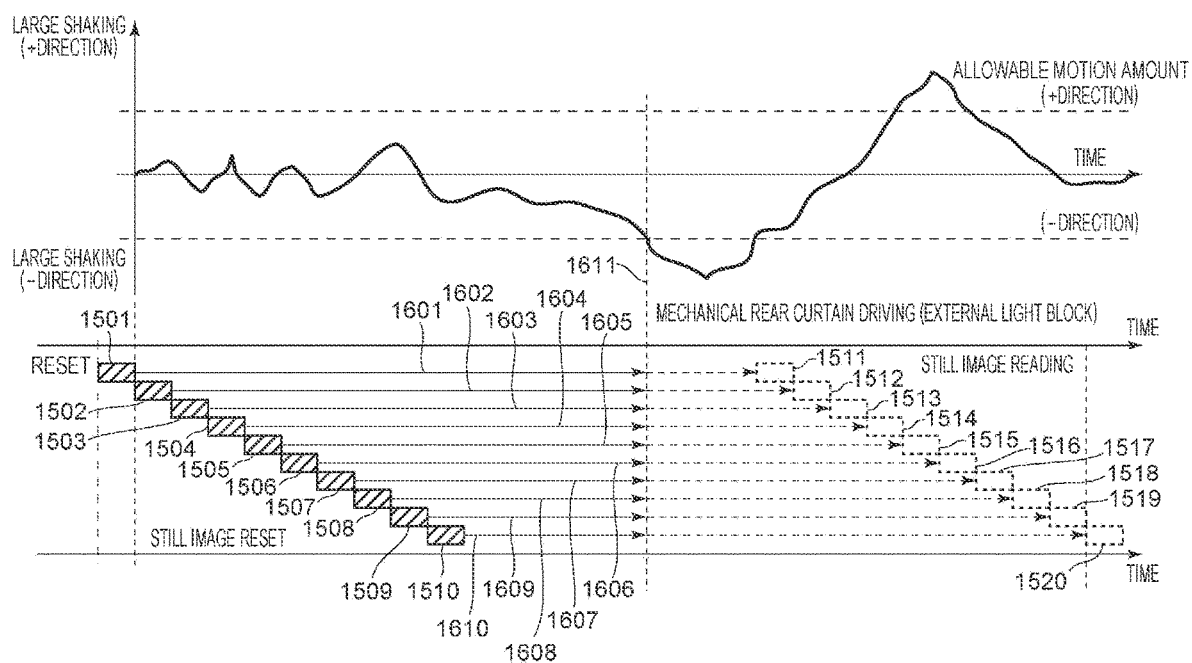
FIG. 16 is a diagram illustrating a method of performing exposure termination control.

FIG. 16 is a timing chart of processing in which the control unit 112 of the camera 101 controls the mechanical rear curtain to interrupt exposure when the subject motion blur amount exceeds the allowable motion amount due to a temporal change in the subject motion blur amount during the main exposure processing. The subject blur is reduced by controlling the mechanical rear curtain and controlling the exposure time when the subject blur is likely to occur in the image during the main exposure.

Lines 1501 to 1510 in FIG. 16 (the photographing conditions are the same as those in FIG. 15B) are reset lines.

After the reset processing of the line 1501 is started, external light reaches the image sensing element 122, and the accumulation of electric charges is started. When the motion of the main body of the camera 101 does not cause an accumulated blur in the image captured during exposure, electric charges are accumulated until the lines 1511 to 1520 (the photographing conditions are the same as those in FIG. 15B) of the next reset processing. In this case, a method of controlling the accumulation of electric charges when the subject motion blur amount exceeds the allowable motion amount during exposure will be described.

The control unit 112 executes reset processing of the head reset line 1501 in FIG. 16 and starts exposure. At this time, when it is detected that the subject motion blur amount increases and exceeds an allowable threshold of shaking at a timing 1611 in FIG. 16, the control unit 112 drives the mechanical rear curtain and closes the mechanical shutter 118 so that external light does not reach the image sensing element 122. Due to the function of the mechanical shutter 118, periods 1601 to 1610 in FIG. 16 serve as the actual exposure time. That is, since exposure is not performed in a period between the periods 1601 to 1610 and the lines 1511 to 1520, electric charges are not accumulated in the image sensing element 122, and thus it is possible to prevent an accumulated blur of the image caused by the influence of shaking of the main body of the camera 101. Although the accumulation of electric charges is stopped by controlling the mechanical shutter 118 in the present description, similar processing can be performed for a shutter not equipped with the mechanical shutter 118 by causing the pulse generation unit 126 to generate a reset pulse to interrupt the accumulation of electric charges.

Then, in step S1306 in FIG. 13, the control unit 112 determines whether the set exposure time has elapsed. If it is determined that the exposure time is shorter than the set exposure time, the processing proceeds to step S1307.

In step S1307, the control unit 112 performs signal processing of multiplying an acquired image by a digital gain corresponding to the difference in exposure time for the exposure time with insufficient image data so as to obtain the brightness corresponding to the original exposure time. The digital gain obtained from the difference in the exposure time is obtained from the following equation.

Digital gain=exposure time set at start of image capturing/(exposure time set at start of image capturing–time from start of exposure to release of mechanical shutter)  (7)

By uniformly multiplying the image by the digital gain calculated by Equation (7), the brightness of the image data is corrected to the brightness corresponding to the expected exposure time. When the gain correction is performed more strictly, a digital gain may be calculated per horizontal line of the image data, and the image data may be multiplied by the digital gain.

In contrast, when the set exposure time has elapsed, the control unit 112 reads electric charges per line and performs the reset processing of the electric charges from the line from which the electric charges have been read, thereby terminating the exposure of the camera 101 and acquiring an image.

Figure 12:
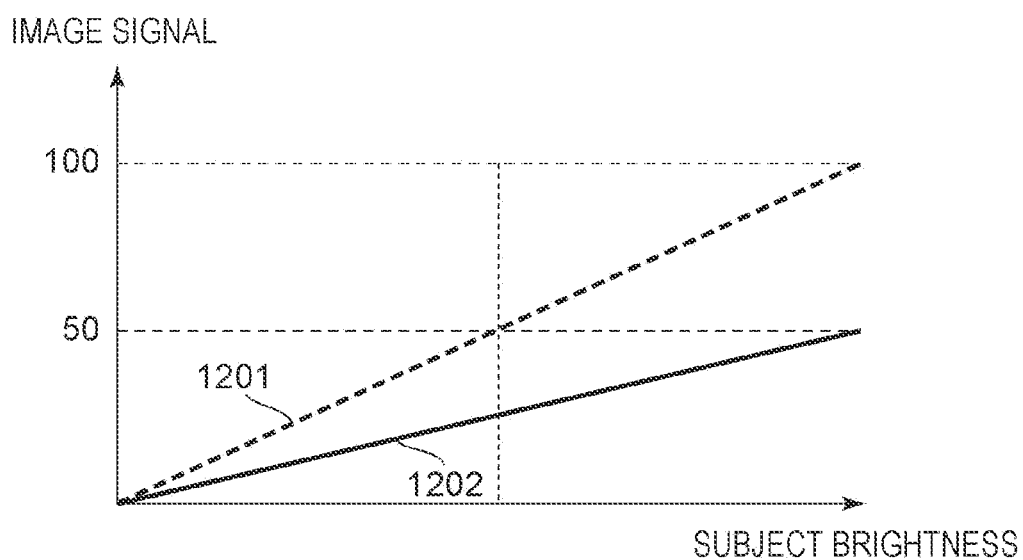
FIG. 12 is a graph presenting processing of correcting an exposure amount by multiplication by a digital gain.

The processing of correcting the exposure amount by multiplication by the digital gain for the insufficient exposure time (exposure amount) performed in step S1307 so as to obtain the brightness corresponding to the original exposure time will be described in detail with reference to FIG. 12. As an example, an image signal 1201 in FIG. 12 indicates an image signal obtained when an image is captured with a target exposure amount, and an image signal 1202 indicates an image signal that does not reach the target exposure amount due to an insufficient exposure time because exposure is interrupted halfway. In FIG. 12, the horizontal axis represents the subject brightness, and the vertical axis represents the image signal level at the subject brightness on the horizontal axis. For example, the image signal 1202 is an image signal in a case where image capturing is performed with an exposure time that is half the exposure time of the image signal 1201 with the target exposure amount. The exposure amount when the camera 101 captures an image is generally determined by the F number, the ISO sensitivity, and the shutter speed (exposure time). Thus, by interrupting the exposure halfway, the exposure amount becomes insufficient as compared with the target exposure amount by an amount corresponding to the shortening of the exposure time. When the exposure time is halved, the exposure amount is halved. Thus, by being multiplied by a double digital gain, the image signal 1202 can be adjusted to have the same exposure amount as the exposure amount of the image signal 1201, and the original target exposure amount can be acquired. By performing the above-described processing through correction per line of the image sensing element 122, even though the exposure is interrupted, it is possible to photograph the subject with the brightness of the original target exposure amount.

The method by which the photographing system 100 according to the second embodiment controls exposure based on the magnitude of a blur of the subject during exposure has been described above with reference to the flowchart in FIG. 13. With the processing, even in a situation in which it is difficult to change the shutter speed during exposure, it is possible to acquire an image in which a subject blur is reduced by controlling the exposure time.

Third Embodiment

Hereinafter, a third embodiment that is a desirable embodiment of the present disclosure will be described in detail with reference to the accompanying drawings. In the third embodiment, a configuration is adopted in which a plurality of subjects as photographing targets wear wearable devices 102 and a camera 101 is set outside the plurality of subjects.

Figure 17:
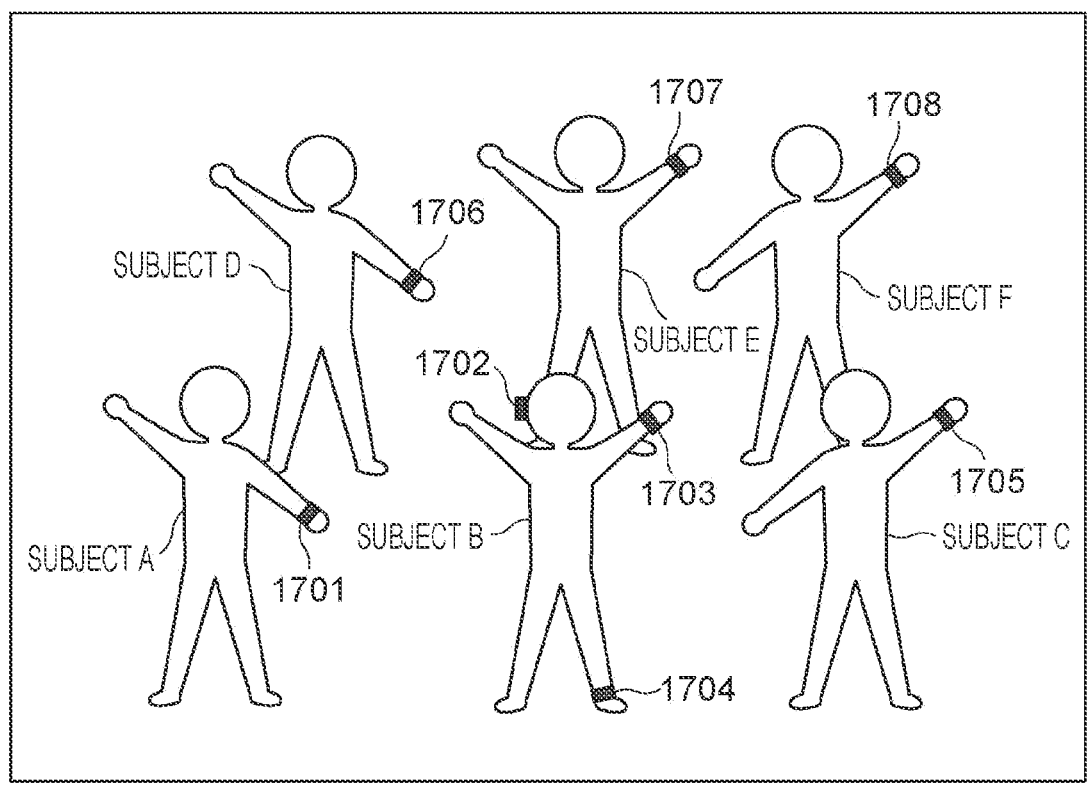
FIG. 17 is an image in a case of a plurality of subjects.

FIG. 17 illustrates an example of a scene in which a plurality of subjects wear wearable devices 102. FIG. 17 illustrates an example in which six subjects of a subject A to a subject F wear wearable devices 102 of wearable devices 1701 to 1708. In this example, the subject A wears the wearable device 102 of the wearable device 1701, the subject B wears the wearable devices 102 of the wearable devices 1702, 1703, and 1704, the subject C wears the wearable device 102 of the wearable device 1705, the subject D wears the wearable device 102 of the wearable device 1706, the subject E wears the wearable device 102 of the wearable device 1707, and the subject F wears the wearable device 102 of the wearable device 1708. Pieces of subject motion information on the respective subjects are sensed through the plurality of wearable devices 102, and photographing conditions of the camera 101 are determined using the acquired subject motion information as auxiliary information.

Processing of the wearable device 102 side of the photographing system 100 according to the third embodiment of the present disclosure is similar to that according to the first embodiment of the present disclosure, and thus description thereof will be omitted. An operation to be performed by the control unit 112 of the camera 101, which is a feature of the third embodiment, will be described with reference to the flowchart in FIG. 18. In the following processing, the control unit 112 of the camera 101 as the photographing system 100 controls each unit of the device in accordance with a program stored in the ROM 113. The wearable device 102 is implemented by the control unit 138 controlling each unit of the device in accordance with a program recorded in the ROM 151. The same steps as those of the first embodiment are denoted by the same reference signs, and detailed description of the processing of the steps will be omitted.

Since the photographing operation of the camera 101 is the same as the processing from step S301 to step S306 in FIG. 3 of the first embodiment, description thereof will be omitted. The processing in step S303, which is a feature of the third embodiment, will be described in detail with reference to the flowchart in FIG. 18. In the flowchart in FIG. 18, description of a portion that performs the same processing as the processing from step S701 to step S705 in FIG. 7 of the first embodiment will be omitted.

Figure 18:
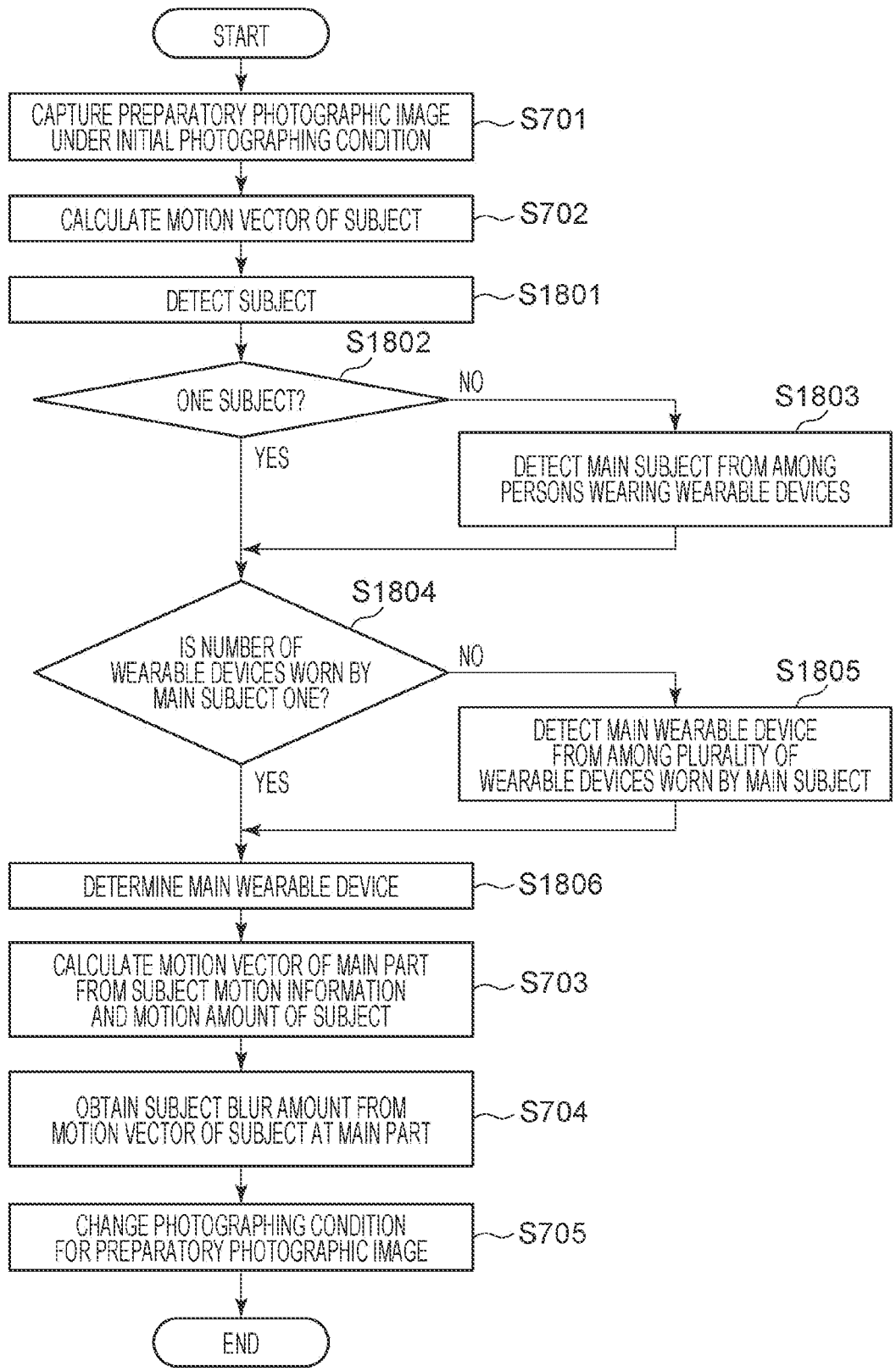
FIG. 18 is a flowchart presenting a case of a plurality of wearable devices.

In step S701 in FIG. 18, the control unit 112 sets initial photographing conditions to the camera 101 and successively captures preparatory photographic images.

In step S702, the motion vector calculation unit of the image processing unit 124 calculates a motion vector of a subject from the preparatory photographic images that are captured in step S701 and successive in time series.

In step S1801, the image processing unit 124 detects a subject from the preparatory photographic images that are captured in step S701 and successive in time series. As a method of detecting the subject, a method such as a general subject detection technique is used. Examples of the method include face/facial organ detection and head detection. The face/facial organ detection is a method of detecting a face and facial organ region in which a face and an organ of a person exist from a captured image. The head detection is a method of detecting a head region in which a head of a person exists from an image captured by a method based on pattern recognition or machine learning.

In step S1802, the image processing unit 124 determines whether the number of subjects detected in step S1801 is one or more. When it is determined that there is one person, the processing proceeds to step S1804, and when it is determined that there are a plurality of persons, the processing proceeds to step S1803.

In step S1803, since the plurality of subjects are detected in step S1802, the image processing unit 124 detects a main subject from among the persons wearing the wearable devices 102. As a method of detecting the main subject, a general main subject detection method may be used. For example, a person who is a subject occupying the largest area in the angle of view in the preparatory photographic image or a person closest to the center of the preparatory photographic image is detected as the main subject. Alternatively, a person registered in advance as the main subject by the user may be detected as the main subject.

In step S1804, it is determined whether the number of wearable devices 102 worn by the person detected as the main subject in step S1803 is one or more. When it is determined that the number of wearable devices 102 is one, the processing proceeds to step S1806, and when it is determined that the number of wearable devices 102 is plural, the processing proceeds to step S1805. As a method of determining the number of wearable devices 102, the user may register the wearable device 102 worn by each subject in advance. Alternatively, the number of wearable devices 102 may be determined by specifying which part of each subject detected in step S1801 the wearable device 102 is worn on. Processing similar to the content described in step S503 in FIG. 5 according to the first embodiment is performed.

In step S1805, since it is determined in step S1804 that the plurality of wearable devices 102 are worn by the person detected as the main subject, a main wearable device 102 is detected from among the plurality of wearable devices 102. A method of detecting the main wearable device 102 (main sensor) will be described in detail with reference to the flowchart in FIG. 19.

In step S1901, the control unit 112 determines whether a priority level of the wearable device 102 is set in advance by the user. When it is determined that the priority level is set, the processing proceeds to step S1904, and when it is determined that the priority level is not set, the processing proceeds to step S1902.

As an example in which the priority level is set in advance by the user, FIG. 20 presents a setting screen example of a priority order of wearable devices 102 that can be set by the user using the camera 101. In FIG. 20, for example, reference sign 2000 denotes a setting screen for setting the priority order of the wearable devices 102 displayed on the display unit 127 of the camera 101 based on an instruction from the control unit 112. Reference sign 2001 denotes subject IDs, which indicate the subjects A to F in the image in FIG. 17. Reference sign 2002 denotes IDs of wearable devices 102, which indicate the wearable devices 102 of the wearable devices 1701 to 1708 in the image in FIG. 17. Reference sign 2003 denotes the priority order of the wearable devices 102. In this setting screen example, the user sets the wearable device 102 of the wearable device 1704 of the subject B to have the highest priority level.

In step S1902, the image processing unit 124 detects the wearable device 102 that is positioned within a predetermined region in the preparatory photographic image for a certain period. For example, when the angle of view of the preparatory photographic image is set to 100% as being within the predetermined region, the wearable device 102 that exists within a rectangular range of 90% around the center coordinates of the preparatory photographic image for a time equal to or longer than a desirably set threshold is detected.

In step S1903, for the wearable device 102 detected in step S1902, the control unit 112 calculates a priority level. For the calculation of the priority level, priority level determination items are set in advance by the user, and the priority level is calculated in accordance with the settings. A setting screen example is illustrated in FIG. 21. Reference sign 2100 denotes a setting screen for setting the priority level determination items for the wearable device 102. Reference sign 2101 denotes contents of priority level determination items, examples thereof including items such as "order of acceleration", "setting of worn part (head, body, hand, foot)", "order of area ratio of face in angle of view", "order of area ratio of worn part in angle of view", "order of distance between center of angle of view and wearable device 102", "order of distance between center of face and wearable device 102", and "order of face detection reliability level". Reference sign 2102 denotes items used as references for priority level determination of the main wearable device 102, and items selected by the user are check-marked for the contents of the items 2101.

A method of calculating a priority level will be described with reference to FIGS. 22A and 22B. For example, when the priority level determination items are set as described with reference to FIG. 21, the control unit 112 calculates a score for each set item, and then calculates a total value obtained by adding each score. The priority order of the wearable devices 102 is set in descending order of the score of the total value, and the priority order of the wearable devices 102 is determined a manner similar to that in FIG. 20 described in step S1901. A method of calculating the score of the total value will be described with reference to FIGS. 22A and 22B.

Figure 22B:
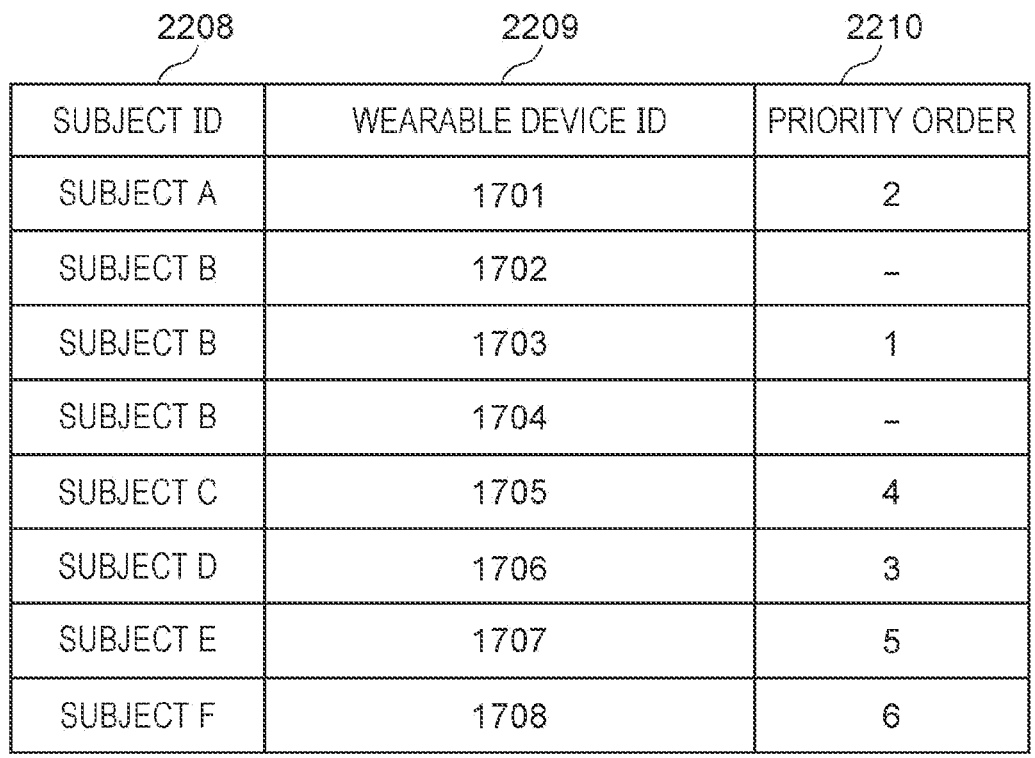

In FIGS. 22A and 22B, reference sign 2201 denotes subject IDs, which indicate the subjects A to F in the image in FIG. 17. Reference sign 2202 denotes IDs of wearable devices 102, which indicate the wearable devices 102 of the wearable devices 1701 to 1708 in the image in FIG. 17. Reference sign 2203 denotes a score value of "order of acceleration", and a wearable device 102 having a higher speed level has a higher score value. Reference sign 2204 denotes "setting of worn part", and since the hand is selected in FIG. 21, the score value of the wearable device 102 worn on the hand becomes high. Reference sign 2205 denotes "order of distance between center of angle of view and wearable device 102", and the closer the distance between the center of the angle of view and the wearable device 102, the higher the score value. Reference sign 2206 denotes "order of face detection reliability level", in which the higher the reliability level of face detection of each subject, the higher the score value. Reference sign 2207 denotes a total score value, which is the total value of the score values calculated for each of the items 2203 to 2206. For example, when the main subject is detected as the subject B in step S1803, the subject B wears three wearable devices 102 of the wearable devices 1702, 1703, and 1704. When "setting of worn part" is set to the hand as the priority level determination item, the total score value of the wearable device 102 of the wearable device 1703 is the largest, and the priority level is the highest.

FIG. 22B illustrates a result of the priority order when the priority order is set based on the calculated total score values. In FIG. 22B, reference sign 2208 denotes subject IDs, which indicate the subjects A to F in the image in FIG. 17. Reference sign 2209 denotes IDs of wearable devices 102, which indicate the wearable devices 102 of the wearable devices 1701 to 1708 in the image in FIG. 17. Reference sign 2210 denotes the priority order of the wearable devices 102.

If the subject B wears the wearable devices 102 on the two hands of the right hand and the left hand, the score values of "setting of worn part" are both 100, and thus the higher the score value of the other item, the higher the priority level.

In step S1904, the control unit 112 temporarily determines the wearable device 102 having the highest priority level as the main wearable device 102 in accordance with the priority order calculated in step S1901 or step S1903.

In step S1905, the control unit 112 determines whether the wearable device 102 temporarily determined in step S1904 is positioned within a predetermined region in the preparatory photographic image for a certain period. For example, when the angle of view of the preparatory photographic image is set to 100% as being within the predetermined region, if the wearable device 102 exists within a rectangular range of 90% around the center coordinates of the preparatory photographic image for a time equal to or longer than a desirably set threshold, the processing proceeds to step S1907. If not, the processing proceeds to step S1906.

In step S1906, the control unit 112 temporarily determines the wearable device 102 having the priority level next to the highest priority level of the wearable device 102 temporarily determined in step S1904 as the main wearable device 102.

Thereafter, the processing proceeds to step S1905, and this determination is repeated until the processing proceeds to step S1907 in which the main wearable device 102 is determined. It is assumed that, after repeating this temporary determination, it is determined that none of the wearable devices 102 among the wearable devices 102 in the priority order determined in step S1901 or step S1903 is positioned within the predetermined region of the preparatory photographic image for the certain period. In this case, the wearable device 102 set in advance as a default is determined as the main wearable device 102 in next step S1907.

In step S1907, the image processing unit 124 detects the wearable device 102 temporarily determined in step S1904 or step S1906 as the main wearable device 102. The flow up to the main sensor determination has been described above.

Figure 19:
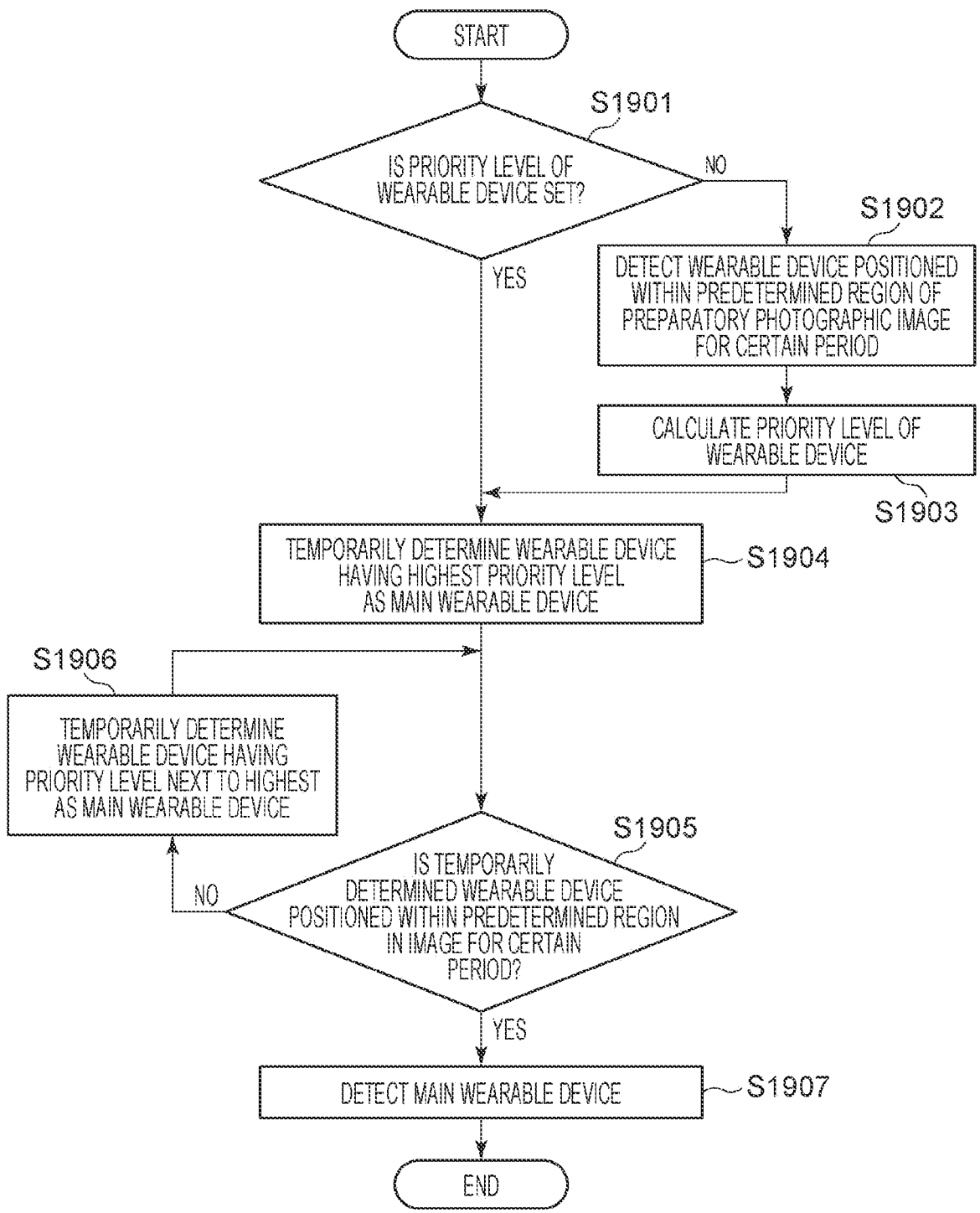
FIG. 19 is a flowchart for determining a main wearable device.

Then, in step S1806 in FIG. 18, based on the detection result of the flow in FIG. 19, the control unit 112 determines the main wearable device 102 in order to acquire information on the wearable device 102 in the next step.

In step S703, the image processing unit 124 calculates a vector corresponding to the main part of the subject using the subject motion information acquired from the main wearable device 102 determined in step S1806 and the motion vector of the subject obtained by the camera 101.

In step S704, the image processing unit 124 estimates an amount of motion blur generated in the subject at the shutter speed set by the user from the motion vector of the subject at the main part calculated in the processing of the above-described step.

In step S705, the control unit 112 compares the subject motion blur amount calculated in step S704 with an allowable motion amount, and changes the shutter speed for the preparatory photographic image to be captured next by the camera 101 so that the subject motion blur amount is the allowable motion amount or less.

The processing of the photographing system 100 according to the third embodiment has been described above. Specifically, even in the scene of the plurality of subjects, the main wearable device 102 is determined from the plurality of wearable devices 102 that are worn. Then, the subject motion information is sensed through the main wearable device 102, and the subject motion information acquired by the wearable device 102 is used as the auxiliary information to update the motion vector of the subject. The photographing conditions of the camera 101 are determined using the result, and an image in which the subject blur is reduced can be acquired.

The priority level determination items for the wearable device 102 include those introduced in step S1903, but are not limited thereto. For example, the score may be calculated to be higher as "distance between camera and subject" or "distance between camera and wearable device 102" is smaller, and the priority level may be set high.

Although desirable embodiments of the present disclosure have been described above, the present disclosure is not limited to these embodiments, and various modifications and changes can be made within the scope of the gist of the present disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-172595, filed Oct. 27, 2022, which is hereby incorporated by reference herein in its entirety.

What is claimed is:

1. A photographing system comprising:
an image capturing device; and
a sensor device worn on a subject,
wherein the image capturing device comprises;
- an image sensor configured to capture an image of the subject,
- an image processor configured to detect a motion of the subject using the captured image,
- a receiver configured to receive a sensing result transmitted from an external device, and
- an exposure controller configured to control exposure of the image sensor, wherein the sensor device comprises;
- a sensor configured to acquire information on the subject, and
- a transmitter configured to transmit the sensing result of the sensor to the image capturing device, and wherein the exposure controller receives the sensing result and controls the exposure of the image sensor using the sensing result and a detection result of the motion,
wherein the image processor calculates a motion vector of the subject using the image captured by the image sensor, and
wherein the exposure controller controls the exposure of the image sensor using the motion vector selected by the image processor using the sensing result of the sensor.

2. The photographing system according to claim 1, wherein the sensor outputs information related to the motion of the wearing subject as the sensing result.

3. The photographing system according to claim 2, wherein the sensor acquires information on a part the sensor device is worn on.

4. The photographing system according to claim 3, wherein the sensor senses at least one of a motion amount, a motion change amount, and a change in position of each part of the subject wearing the sensor device.

5. The photographing system according to claim 1, wherein the image processor calculates a motion vector of the subject using the image captured by the image sensor, and
wherein the exposure controller controls the exposure of the image sensor using the motion vector calculated by the image processor.

6. The photographing system according to claim 1, wherein the exposure controller controls an exposure time set before the image sensor captures the image.

7. A photographing system comprising:
an image capturing device; and
a sensor device worn on a subject,
wherein the image capturing device comprises;
- an image sensor configured to capture an image of the subject,
- an image processor configured to detect a motion of the subject using the captured image,
- a receiver configured to receive a sensing result transmitted from an external device, and
- an exposure controller configured to control exposure of the image sensor, wherein the sensor device comprises;
- a sensor configured to acquire information on the subject, and
- a transmitter configured to transmit the sensing result of the sensor to the image capturing device, and wherein the exposure controller receives the sensing result and controls the exposure of the image sensor using the sensing result and a detection result of the motion,
wherein the image processor calculates a motion vector of the subject using the image captured by the image sensor,
wherein the exposure controller controls the exposure of the image sensor using the motion vector calculated by the image processor,
wherein the image capturing device further comprises:
- a reliability level calculator configured to calculate a reliability level of the motion vector of the subject,
- wherein the exposure controller selects the motion vector based on the reliability level and controls the exposure of the image sensor using the selected motion vector.

8. A photographing system comprising:
an image capturing device; and
a sensor device worn on a subject,
wherein the image capturing device comprises;
- an image sensor configured to capture an image of the subject,
- an image processor configured to detect a motion of the subject using the captured image,
- a receiver configured to receive a sensing result transmitted from an external device, and
- an exposure controller configured to control exposure of the image sensor, wherein the sensor device comprises;
- a sensor configured to acquire information on the subject, and
- a transmitter configured to transmit the sensing result of the sensor to the image capturing device, and wherein the exposure controller receives the sensing result and controls the exposure of the image sensor using the sensing result and a detection result of the motion,
wherein, when an exposure amount is insufficient with respect to a target exposure amount set before image capturing, the exposure controller performs correction processing by multiplication by a digital gain.

* * * * *